US012610194B2

(12) United States Patent
Ryu et al.

(10) Patent No.: US 12,610,194 B2
(45) Date of Patent: Apr. 21, 2026

(54) VIBRATION APPARATUS AND APPARATUS INCLUDING THE SAME

(71) Applicant: LG Display Co., Ltd., Seoul (KR)

(72) Inventors: Kyungyeol Ryu, Paju-si (KR); Seungryull Park, Paju-si (KR); Sungwook Ko, Paju-si (KR); Mingyu Kang, Paju-si (KR); Dasol Park, Paju-si (KR)

(73) Assignee: LG DISPLAY CO., LTD., Seoul (KR)

( * ) Notice: Subject to any disclaimer, the term of this patent is extended or adjusted under 35 U.S.C. 154(b) by 263 days.

(21) Appl. No.: 18/227,038

(22) Filed: Jul. 27, 2023

(65) Prior Publication Data

US 2024/0064470 A1 Feb. 22, 2024

(30) Foreign Application Priority Data

Aug. 16, 2022 (KR) ........................ 10-2022-0102125

(51) Int. Cl.
*H04R 9/06* (2006.01)
*H04R 31/00* (2006.01)

(52) U.S. Cl.
CPC ............... *H04R 9/06* (2013.01); *H04R 31/00* (2013.01)

(58) Field of Classification Search
CPC ...... H04R 9/06; H04R 31/00; H04R 2499/11; H04R 2499/15; H04R 17/00; H04R 9/02; H04R 2400/11; H04R 2307/00; H04R 7/045; H04R 7/06; B06B 1/0644; H10N 30/20; H10K 59/00
See application file for complete search history.

(56) References Cited

U.S. PATENT DOCUMENTS

| | | | | |
|---|---|---|---|---|
| 5,359,760 | A | 11/1994 | Busse et al. | |
| 5,527,501 | A | 6/1996 | Sawada et al. | |
| 5,620,637 | A | 4/1997 | Kaga et al. | |
| 2020/0296493 | A1* | 9/2020 | Won | H04R 17/00 |
| 2022/0201401 | A1* | 6/2022 | Ko | H10N 30/8554 |
| 2022/0210529 | A1* | 6/2022 | Nam | H04R 1/403 |

* cited by examiner

*Primary Examiner* — Vivian C Chin
*Assistant Examiner* — Annabelle Kang
(74) *Attorney, Agent, or Firm* — Birch, Stewart, Kolasch & Birch, LLP

(57) ABSTRACT

A vibration apparatus includes a vibration generating part including one or more vibration parts, a first cover member covering a first surface of the vibration generating part, a second cover member covering a second surface of the vibration generating part, the second surface being opposite to the first surface of the vibration generating part, and a signal supply member electrically connected to the one or more vibration parts and disposed between the first surface of the vibration generating part and the first cover member.

23 Claims, 13 Drawing Sheets

VIBRATION APPARATUS AND APPARATUS INCLUDING THE SAME

CROSS-REFERENCE TO RELATED APPLICATIONS

This application claims priority to Korean Patent Application No. 10-2022-0102125, filed in the Republic of Korea on Aug. 16, 2022, the entire contents of each which are hereby expressly incorporated by reference into the present application.

BACKGROUND

Field

The present disclosure relates to a vibration apparatus and an apparatus including the same.

Discussion of the Related Art

Recently, a need for slimming and thinning electronic devices is increasing. Also, as speakers applied to electronic devices or the like need to slim and thin, piezoelectric elements (instead of voice coils) capable of realizing a thin thickness are attracting much attention.

Speakers or vibration apparatuses with a piezoelectric element applied thereto can be driven or vibrated by a driving power or a driving signal supplied through a signal supply member.

Vibration apparatuses (or film actuators) include a film having a pad electrode and a line for applying a driving power to a piezoelectric element. The vibration apparatuses need a process of patterning the line and the pad electrode on the film, and a soldering process or the like of electrically connecting the pad electrode to a signal supply member.

SUMMARY OF THE DISCLOSURE

The inventors of the present disclosure have performed various researches and experiments for implementing a vibration apparatus in which a manufacturing process and a structure of the vibration apparatus can be simplified. Through the various researches and experiments, the inventors of the present disclosure have invented a vibration apparatus having a new structure and an apparatus including the same, in which a manufacturing process and a structure of the vibration apparatus can be simplified.

One or more aspects of the present disclosure are directed to providing a vibration apparatus and an apparatus (e.g., device, system, module, etc.) including the same, in which a manufacturing process and a structure of the vibration apparatus can be simplified.

One or more aspects of the present disclosure are directed to providing a vibration apparatus, which can be connected to a signal supply member without a soldering process, and an apparatus including the vibration apparatus.

One or more aspects of the present disclosure are directed to providing a vibration apparatus with a signal supply member integrated therein and an apparatus including the vibration apparatus.

One or more aspects of the present disclosure are directed to providing a vibration apparatus and an apparatus including the same, which can prevent a crack or damage from occurring in a vibration generating part due to a step height between lines of a signal supply member in a process of manufacturing the vibration apparatus.

One or more aspects of the present disclosure are directed to providing a vibration apparatus and an apparatus including the same, in which a sound characteristic can be enhanced.

Additional features, advantages, and aspects are set forth in part in the description that follows, and will also be apparent from the present disclosure or can be learned by practice of the inventive concepts provided herein. Other features, advantages, and aspects of the present disclosure can be realized and attained by the structure particularly pointed out in the present disclosure, or derivable therefrom, and claims hereof as well as the appended drawings.

To achieve these and other aspects of the present disclosure, as embodied and broadly described herein, a vibration apparatus comprises a vibration generating part including one or more vibration parts, a first cover member covering a first surface of the vibration generating part, a second cover member covering a second surface of the vibration generating part, the second surface being opposite to the first surface of the vibration generating part, and a signal supply member electrically connected to the one or more vibration parts and disposed between the first surface of the vibration generating part and the first cover member.

In one or more aspects, an apparatus comprises a passive vibration member and one or more vibration generating apparatuses configured to vibrate the passive vibration member. Further, the one or more vibration generating apparatuses include a vibration apparatus. Further, the vibration apparatus comprises a vibration generating part including one or more vibration parts, a first cover member covering a first surface of the vibration generating part, a second cover member covering a second surface of the vibration generating part, the second surface being opposite to the first surface of the vibration generating part, and a signal supply member electrically connected to the one or more vibration parts and disposed between the first surface of the vibration generating part and the first cover member.

According to one or more embodiments of the present disclosure, a structure and a manufacturing process of a vibration apparatus can be simplified.

According to one or more embodiments of the present disclosure, a signal supply member and a vibration apparatus can be connected to each other without a soldering process.

According to one or more embodiments of the present disclosure, as a signal supply member and a vibration apparatus are provided as one body, the signal supply member and the vibration apparatus can be configured as one part (or an element or a component).

According to one or more embodiments of the present disclosure, a crack or damage can be prevented from occurring in a vibration generating part due to a step height between lines of a signal supply member in a process of manufacturing a vibration apparatus.

According to one or more embodiments of the present disclosure, a sound pressure level characteristic of a sound can be enhanced.

Other systems, methods, features and advantages will be, or will become, apparent to one with skill in the art upon examination of the following figures and detailed description. It is intended that all such additional systems, methods, features and advantages be included within this description, and be within the scope of the present disclosure. Nothing in this section should be taken as a limitation on the claims. Further aspects and advantages are discussed below in conjunction with aspects of the disclosure.

It is to be understood that both the foregoing description and the following description of the present disclosure are by way of example and are intended to provide further explanation of the disclosure as claimed.

BRIEF DESCRIPTION OF THE DRAWINGS

The accompanying drawings, which are included to provide a further understanding of the disclosure and are incorporated in and constitute a part of this disclosure, illustrate aspects and embodiments of the disclosure and together with the description serve to explain principles of the disclosure.

Figure 1:
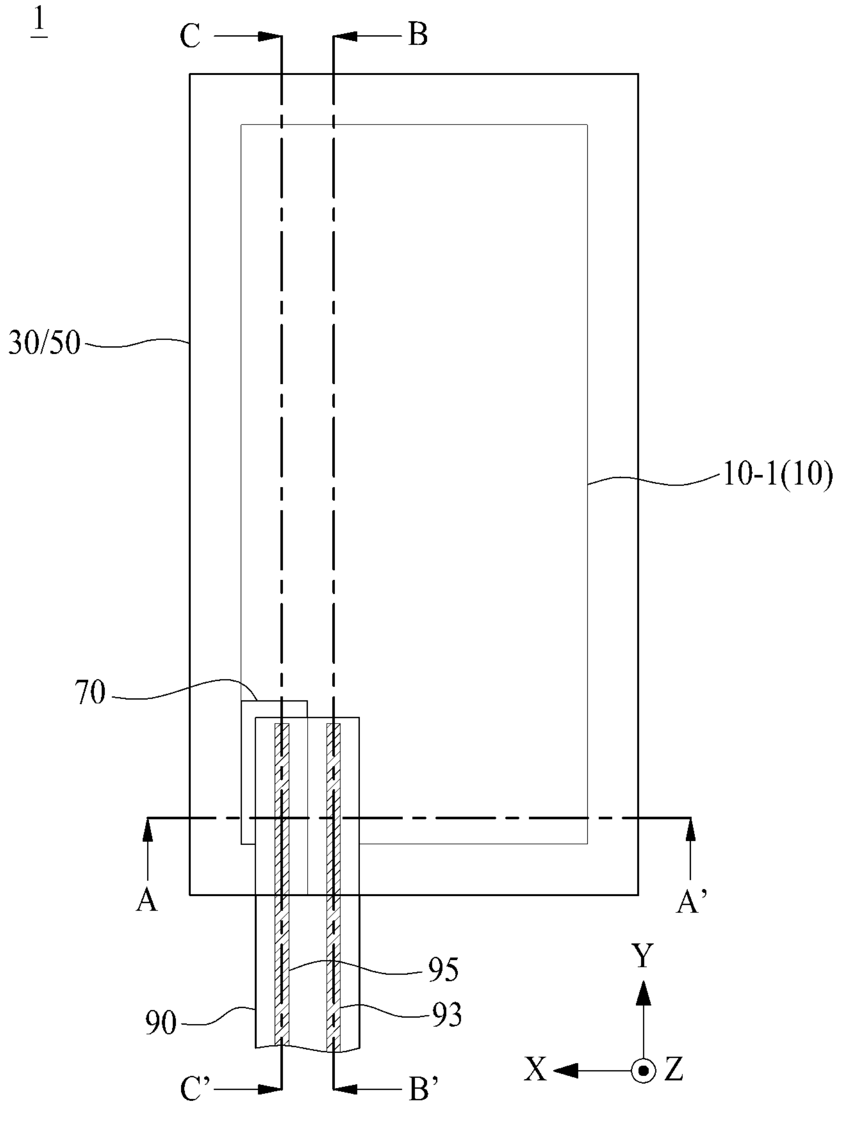
FIG. 1 illustrates a vibration apparatus according to a first embodiment of the present disclosure.

Throughout the drawings and the detailed description, unless otherwise described, the same drawing reference numerals should be understood to refer to the same elements, features, or structures. The sizes, lengths, and thicknesses of layers, regions and elements, and depiction thereof can be exaggerated for clarity, illustration, or convenience.

DETAILED DESCRIPTION OF THE EMBODIMENTS

Reference is now made in detail to embodiments of the present disclosure, examples of which can be illustrated in the accompanying drawings. In the following description, where a detailed description of relevant known functions or configurations can unnecessarily obscure aspects of the present disclosure, a detailed description of such known functions or configurations can be omitted for brevity. The progression of processing steps and/or operations described is an example, and the sequence of steps and/or operations is not limited to that set forth herein and can be changed, with the exception of steps and/or operations necessarily occurring in a particular order.

Advantages and features of the present disclosure, and implementation methods thereof, are clarified through the following example embodiments described with reference to the accompanying drawings. The present disclosure may, however, be embodied in different forms and should not be construed as limited to the example embodiments set forth herein. Rather, these example embodiments are provided so that this disclosure can be sufficiently thorough and complete to assist those skilled in the art to understand the inventive concepts fully without limiting the protected scope of the present disclosure.

The shapes, dimensions, areas, ratios, angles, numbers, and the like, which are illustrated in the drawings to describe various example embodiments of the present disclosure, are merely given by way of example. Therefore, the present disclosure is not limited to the illustrations in the drawings. Like reference numerals generally denote like elements throughout the specification, unless otherwise specified.

Where a term like "comprise," "have," "include," "contain," "constitute," "made up of," or "formed of" is used, one or more other elements can be added unless a more limiting term, such as "only" or the like is used. The terms and names used in the present disclosure are merely used to describe particular embodiments, and are not intended to limit the scope of the present disclosure. An element described in the singular form is intended to include a plurality of elements, and vice versa, unless the context clearly indicates otherwise.

The word "exemplary" is used to mean serving as an example or illustration, unless otherwise specified. Embodiments are example embodiments. Aspects are example aspects. Any implementation described herein as an "example" is not necessarily to be construed as preferred or advantageous over other implementations.

In one or more aspects, an element, feature, or corresponding information (e.g., a level, range, dimension, size, or the like) is construed as including an error or tolerance range even where no explicit description of such an error or tolerance range is provided. An error or tolerance range can be caused by various factors (e.g., process factors, internal or external impact, noise, or the like). Further, the term "may" encompasses all the meanings of the term "can."

In describing a positional relationship, where the positional relationship between two parts is described, for example, using "on," "over," "under," "above," "below," "beneath," "near," "close to," "adjacent to," "beside," "next to," or the like, one or more other parts can be located between the two parts unless a more limiting term, such as "immediate(ly)," "direct(ly)," or "close(ly)," is used. For example, where a structure is described as being positioned "on," "over," "under," "above," "below," "beneath," "near," "close to," "adjacent to," "beside," or "next to" another structure, this description should be construed as including a case in which the structures contact each other as well as a case in which one or more additional structures are disposed or interposed therebetween. Furthermore, the terms "front," "rear," "back," "left," "right," "top," "bottom," "downward," "upward," "upper," "lower," "up," "down," "column," "row," "vertical," "horizontal," and the like refer to an arbitrary frame of reference, unless otherwise specified.

In describing a temporal relationship, where the temporal order is described as, for example, "after," "subsequent," "next," "before," "preceding," "prior to," or the like a case that is not consecutive or not sequential can be included unless a more limiting term, such as "just," "immediate(ly)," or "direct(ly)," is used.

It will be understood that, although the term "first," "second," or the like can be used herein to describe various elements, these elements should not be limited by these terms, for example, to any particular order, sequence, precedence, or number of elements. These terms are only used to distinguish one element from another. For example, a first element could be a second element, and, similarly, a second element could be a first element, without departing from the scope of the present disclosure. Furthermore, the first element, the second element, and the like can be arbitrarily named according to the convenience of those skilled in the art without departing from the scope of the present disclosure. The terms "first," "second," and the like can be used to distinguish components from each other, but the functions or structures of the components are not limited by ordinal numbers or component names in front of the components.

In describing elements of the present disclosure, the terms "first," "second," "A," "B," "(a)," "(b)," or the like can be used. These terms are intended to identify the corresponding element(s) from the other element(s), and are not used to define the essence, basis, order, or number of the elements.

Where an element is describes as "connected," "coupled," "attached," or "adhered" to another element or layer, the element or layer can not only be directly connected, coupled, attached, or adhered to another element or layer, but also be indirectly connected, coupled, attached, or adhered to another element or layer with one or more intervening elements or layers disposed or interposed between the elements or layers, unless otherwise specified.

For the expression that an element or layer "contacts," "overlaps," or the like with another element or layer, the element or layer can not only directly contact, overlap, or the like with another element or layer, but also indirectly contact, overlap, or the like with another element or layer with one or more intervening elements or layers disposed or interposed between the elements or layers, unless otherwise specified.

Such terms as a "line" or "direction" should not be interpreted only based on a geometrical relationship in which the respective lines or directions are parallel or perpendicular to each other. Such terms can mean a wider range of lines or directions within which the components of the present disclosure can operate functionally.

The term "at least one" should be understood as including any and all combinations of one or more of the associated listed items. For example, the meaning of "at least one of a first item, a second item, and a third item" encompasses the combination of all three listed items, combinations of any two the first item, the second item, and the third item as well as any individual item, the first item, the second item, or the third item.

The expression of a first element, a second elements, "and/or" a third element should be understood to encompass one of the first, second and third elements, as well as any and all combinations of the first, second and third elements. By way of example, A, B and/or C encompass only A; only B; only C; any combination of two of A, B, and C; and all of A, B, and C. Furthermore, an expression "element A/element B" can be understood as element A and/or element B.

In one or more aspects, the terms "between" and "among" can be used interchangeably simply for convenience unless stated otherwise. For example, an expression "between a plurality of elements" can be understood as among a plurality of elements. In another example, an expression "among a plurality of elements" can be understood as between a plurality of elements. In one or more examples, the number of elements can be two. In one or more examples, the number of elements can be more than two.

In one or more aspects, the phrases "each other" and "one another" can be used interchangeably simply for convenience unless stated otherwise. For example, an expression "different from each other" can be understood as different from one another. In another example, an expression "different from one another" can be understood as different from each other. In one or more examples, the number of elements involved in the foregoing expression can be two. In one or more examples, the number of elements involved in the foregoing expression can be more than two.

In one or more aspects, the phrases "one or more among" and "one or more of" can be used interchangeably simply for convenience unless stated otherwise.

Features of various embodiments of the present disclosure can be partially or wholly coupled to or combined with each other, and can be operated, linked or driven together in various ways. The embodiments of the present disclosure can be carried out independently from each other, or can be carried out together in a co-dependent or related relationship. In one or more aspects, the components of each apparatus according to various embodiments of the present disclosure can be operatively coupled and configured.

Unless otherwise defined, the terms (including technical and scientific terms) used herein have the same meaning as commonly understood by one of ordinary skill in the art to which example embodiments belong. It should be further understood that terms, such as those defined in commonly used dictionaries, should be interpreted as having a meaning that is, for example, consistent with their meaning in the context of the relevant art and should not be interpreted in an idealized or overly formal sense unless expressly defined otherwise herein.

In the following description, various example embodiments of the present disclosure are described in detail with reference to the accompanying drawings. With respect to reference numerals to elements of each of the drawings, the same elements can be illustrated in other drawings, and like reference numerals can refer to like elements unless stated otherwise. In addition, for convenience of description, a scale, dimension, size, and thickness of each of the elements illustrated in the accompanying drawings can be different from an actual scale, dimension, size, and thickness. Thus, embodiments of the present disclosure are not limited to a scale, dimension, size, or thickness illustrated in the drawings.

Figure 2:
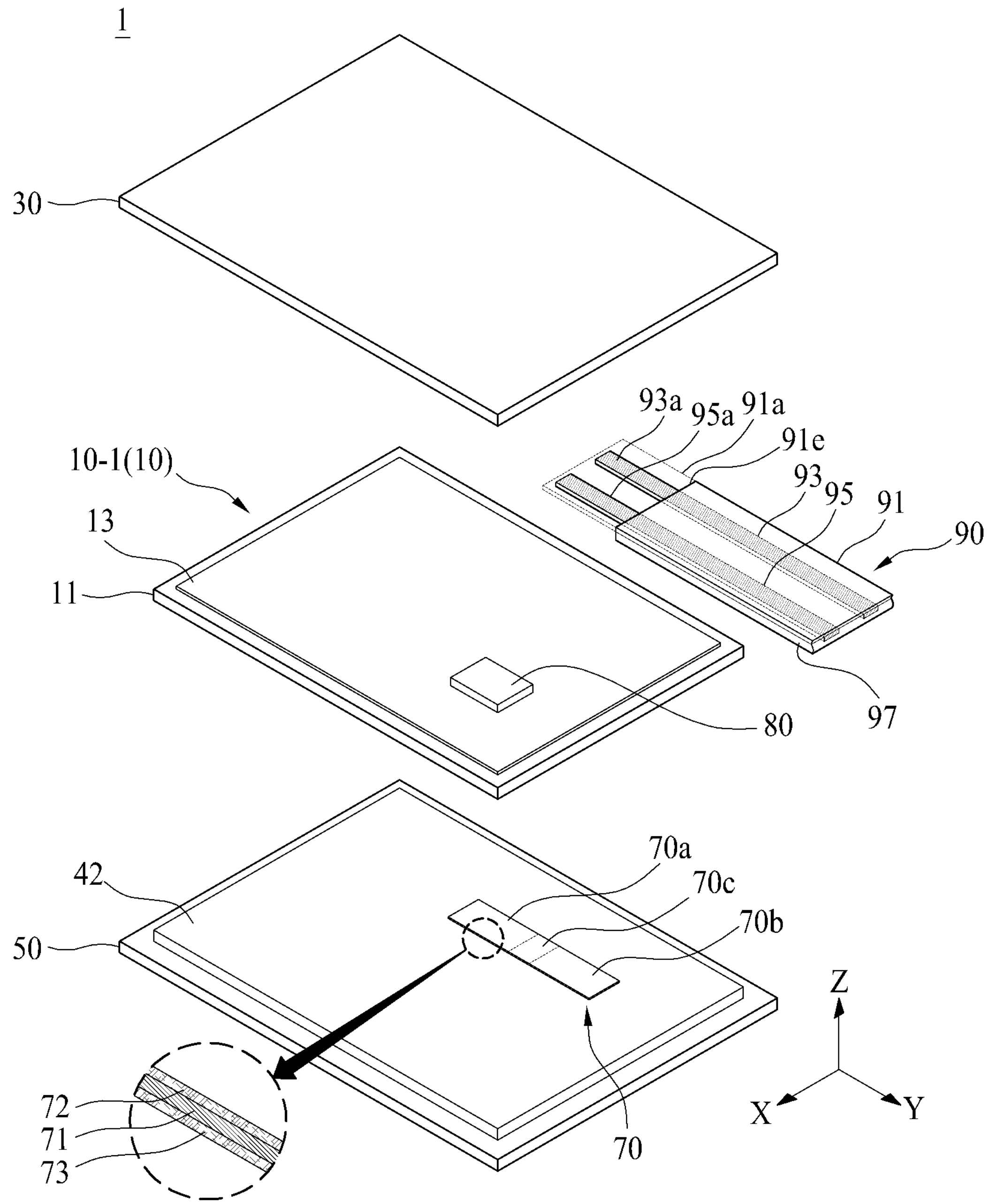
FIG. 2 is an exploded perspective view of the vibration apparatus illustrated in FIG. 1 according to the first embodiment of the present disclosure.
Figure 3:
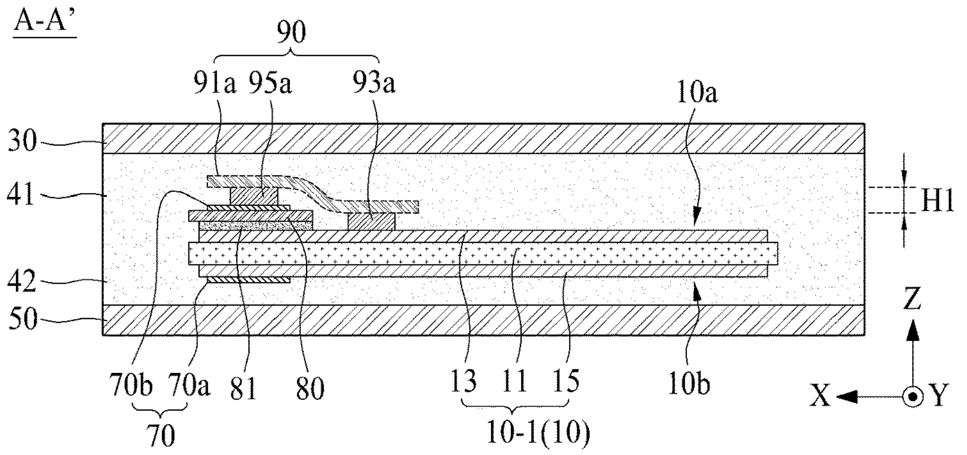
FIG. 3 is a cross-sectional view taken along line A-A' of FIG. 1 according to the first embodiment of the present disclosure.
Figure 4:
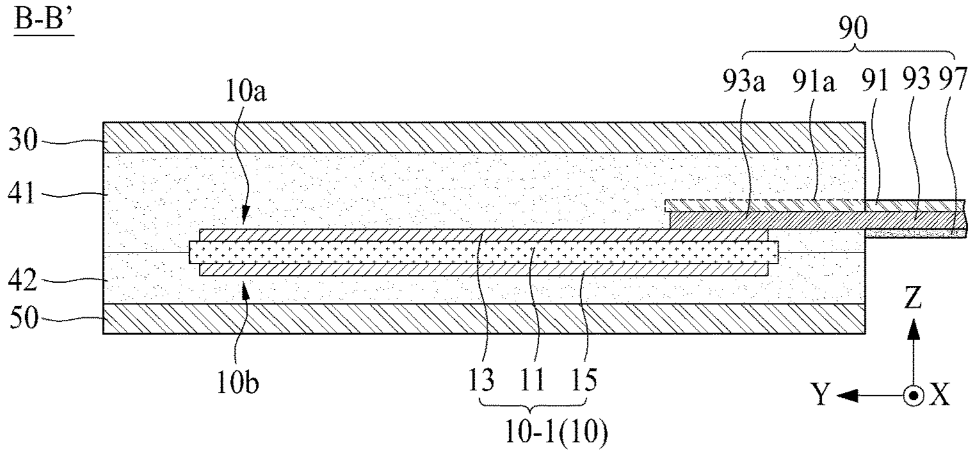
FIG. 4 is a cross-sectional view taken along line B-B' of FIG. 1 according to the first embodiment of the present disclosure.
Figure 5:
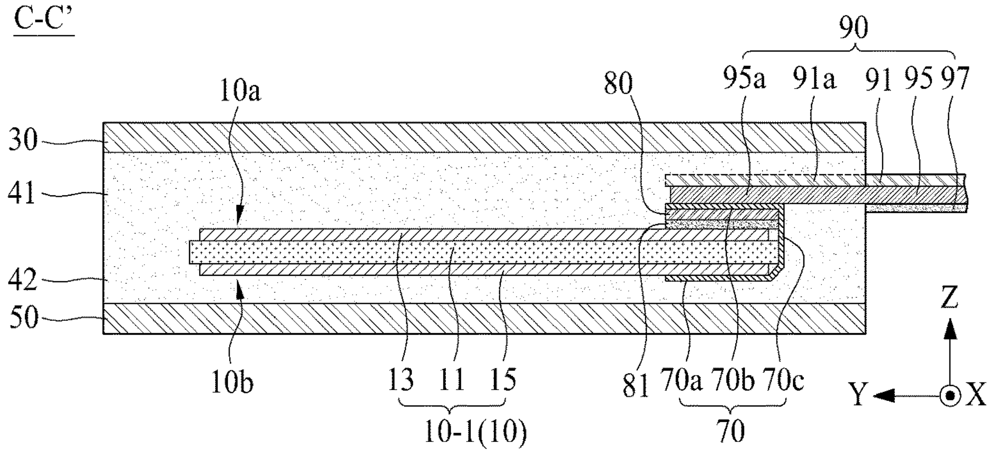
FIG. 5 is a cross-sectional view taken along line C-C' of FIG. 1 according to the first embodiment of the present disclosure.

FIG. 1 illustrates a vibration apparatus according to a first embodiment of the present disclosure. FIG. 2 is an exploded perspective view of the vibration apparatus illustrated in FIG. 1 according to the first embodiment of the present disclosure. FIG. 3 is a cross-sectional view taken along line A-A' of FIG. 1 according to the first embodiment of the present disclosure. FIG. 4 is a cross-sectional view taken along line B-B' of FIG. 1 according to the first embodiment of the present disclosure. FIG. 5 is a cross-sectional view taken along line C-C' of FIG. 1 according to the first embodiment of the present disclosure.

With reference to FIGS. 1 to 5, a vibration apparatus 1 according to the first embodiment of the present disclosure can include a vibration generating part 10, a first cover member 30, a second cover member 50, a connection member 70, and a signal supply member 90.

The vibration generating part 10 can be configured to vibrate based on a driving signal (or a sound signal or a voice signal) supplied through the signal supply member 90. For example, the vibration generating part 10 can include a first surface 10*a* and a second surface 10*b* opposite to the first surface 10*a*. In the vibration generating part 10, the first surface 10*a* can be an upper surface, a front surface, an uppermost electrode layer, an uppermost electrode part, or an uppermost electrode surface. The second surface 10*b* can be a lower surface, a back surface, a rear surface, a lowermost electrode layer, a lowermost electrode part, or a lowermost electrode surface.

The vibration generating part 10 according to an embodiment of the present disclosure can include one or more vibration parts 10-1. In the following description, one or more vibration parts 10-1 can be referred to as a vibration part 10-1.

The vibration part 10-1 according to an embodiment of the present disclosure can include a vibration layer 11, a first electrode layer 13, and a second electrode layer 15.

The vibration layer 11 can include a piezoelectric material (or an electroactive material) which includes a piezoelectric effect. For example, the piezoelectric material can have a characteristic in which, when pressure or twisting (or bending) is applied to a crystalline structure by an external force, a potential difference occurs due to dielectric polarization caused by a relative position change of a positive (+) ion and a negative (−) ion, and a vibration is generated by an electric field based on a reverse voltage applied thereto. For example, the vibration layer 11 can be referred to as a piezoelectric layer, a piezoelectric material layer, an electroactive layer, a piezoelectric material portion, an electroactive portion, a piezoelectric structure, a piezoelectric composite layer, a piezoelectric composite, or a piezoelectric ceramic composite, or the like, but embodiments of the present disclosure are not limited thereto.

The vibration layer 11 can be configured as a ceramic-based material for generating a relatively high vibration, or can be configured as a piezoelectric ceramic having a perovskite-based crystalline structure.

The piezoelectric ceramic can be configured as a single crystalline ceramic having a crystalline structure, or can be configured as a ceramic material having a polycrystalline structure or polycrystalline ceramic. A piezoelectric material including the single crystalline ceramic can include $\alpha$-$AlPO_4$, $\alpha$-$SiO_2$, $LiNbO_3$, $Tb_2(MoO_4)_3$, $Li_2B_4O_7$, or ZnO, but embodiments of the present disclosure are not limited thereto. A piezoelectric material including the polycrystalline ceramic can include a lead zirconate titanate (PZT)-based material, including lead (Pb), zirconium (Zr), and titanium (Ti), or can include a lead zirconate nickel niobate (PZNN)-based material, including lead (Pb), zirconium (Zr), nickel (Ni), and niobium (Nb), but embodiments of the present disclosure are not limited thereto. For example, the vibration layer 11 can include at least one or more of calcium titanate ($CaTiO_3$), barium titanate ($BaTiO_3$), and strontium titanate ($SrTiO_3$), without lead (Pb), but embodiments of the present disclosure are not limited thereto.

The vibration layer 11 according to an embodiment of the present disclosure can include a piezoelectric sintered material (or piezoelectric ceramic) which is manufactured by sintering (or firing) a piezoelectric powder (or a ceramic powder) at a high sintering (or firing) temperature of 1,200° C. or more, but embodiments of the present disclosure are not limited thereto. For example, the piezoelectric sintered material can be manufactured by a high temperature sintering process performed on a piezoelectric powder disposed on a high temperature firing paper.

The vibration layer 11 can include a first surface and a second surface opposite to the first surface. For example, the first surface of the vibration layer 11 can be an upper surface or a front surface. The second surface of the vibration layer 11 can be a lower surface, a back surface, or a rear surface.

The first electrode layer 13 can be configured or coupled to the first surface of the vibration layer 11. The first electrode layer 13 can have the same size as the vibration layer 11, or can have a size which is smaller than the vibration layer 11. For example, the first electrode layer 13 can be an upper electrode layer, a front electrode layer, a topmost electrode layer, or an uppermost electrode layer.

The second electrode layer 15 can be configured or coupled to the second surface of the vibration layer 11. The second electrode layer 15 can have the same size as the vibration layer 11, or can have a size which is smaller than the vibration layer 11. For example, the second electrode layer 15 can have the same shape as the vibration layer 11, but embodiments of the present disclosure are not limited thereto. The second electrode layer 15 can be a lower electrode layer, a rear electrode layer, a bottommost electrode layer, or a lowermost electrode layer.

According to an embodiment of the present disclosure, in order to prevent electrical short circuit between the first electrode layer 13 and the second electrode layer 15, each of the first electrode layer 13 and the second electrode layer 15 can be formed at the other portion, except a periphery portion, of the vibration layer 11. For example, the first electrode layer 13 can be formed at an entire first surface, other than a periphery portion, of the vibration layer 11. For example, the second electrode layer 15 can be formed at an entire second surface, other than a periphery portion, of the vibration layer 11. For example, a distance between a lateral surface (or a sidewall) of each of the first electrode layer 13 and the second electrode layer 15 and a lateral surface (or a sidewall) of the vibration layer 11 can be at least 0.5 mm or more. For example, the distance between the lateral surface of each of the first electrode layer 13 and the second electrode layer 15 and the lateral surface of the vibration layer 11 can be at least 1 mm or more, but embodiments of the present disclosure are not limited thereto.

According to an embodiment of the present disclosure, one or more of the first electrode layer 13 and the second electrode layer 15 can be formed of a transparent conductive material, a semitransparent conductive material, or an opaque conductive material. For example, the transparent conductive material or the semitransparent conductive material of one or more of the first electrode layer 13 and the second electrode layer 15 can include indium tin oxide (ITO) or indium zinc oxide (IZO), but embodiments of the present disclosure are not limited thereto. The opaque conductive material of one or more of the first electrode layer 13 and the second electrode layer 15 can include gold (Au), silver (Ag), platinum (Pt), palladium (Pd), molybdenum (Mo), magnesium (Mg), carbon, or silver (Ag) including glass frit, or the like, or can be formed of an alloy thereof, but embodiments of the present disclosure are not limited thereto. For example, in order to enhance an electrical characteristic and/or a vibration characteristic of the vibration layer 11, each of the first electrode layer 13 and the second electrode layer 15 can include silver (Ag) having a low resistivity. For example, carbon can be carbon black, ketjen black, carbon nanotube, and a carbon material including graphite, but embodiments of the present disclosure are not limited thereto.

In the first electrode layer 13 and the second electrode layer 15 including silver (Ag) including glass frit, a content of the glass frit can be 1 wt % to 12 wt %, but embodiments of the present disclosure are not limited thereto. The glass frit can include PbO or $Bi_2O_3$-based material, but embodiments of the present disclosure are not limited thereto.

The vibration layer 11 can be polarized (or poling) by a certain voltage applied to the first electrode layer 13 and the second electrode layer 15 in a certain temperature atmosphere, or a temperature atmosphere that can be changed from a high temperature to a room temperature, but embodiments of the present disclosure are not limited thereto. For example, the vibration layer 11 can alternately and repeatedly contract and/or expand based on an inverse piezoelectric effect according to a driving signal applied to the first electrode layer 13 and the second electrode layer 15 from the outside to vibrate. For example, the vibration layer 11 can vibrate based on a vertical-direction vibration and a planar direction vibration by the driving signal applied to the first electrode layer 13 and the second electrode layer 15. Accordingly, the amount of displacement of the vibration generating part 10 can increase or improve by contraction and/or expansion of the planar direction.

The first cover member 30 can be disposed at the first surface 10*a* of the vibration generating part 10 or the first surface of the vibration part 10-1. For example, the first cover member 30 can be configured to cover the first surface 10*a* of the vibration generating part 10 or the first surface of the vibration part 10-1. For example, the first cover member 30 can be configured to cover the first electrode layer 13 of the vibration part 10-1. The first cover member 30 can protect the first surface 10*a* of the vibration generating part 10, or can protect the first surface of the vibration part 10-1 or the first electrode layer 13 of the vibration part 10-1.

The second cover member 50 can be disposed at the second surface 10*b* of the vibration generating part 10 or the second surface of the vibration part 10-1. For example, the second cover member 50 can be configured to cover the second surface 10*b* of the vibration generating part 10 or the second surface of the vibration part 10-1. For example, the second cover member 50 can be configured to cover the second electrode layer 15 of the vibration part 10-1. The second cover member 50 can protect the second surface 10*b* of the vibration generating part 10, or can protect the second surface of the vibration part 10-1 or the second electrode layer 15 of the vibration part 10-1.

Each of the first cover member 30 and the second cover member 50 according to an embodiment of the present disclosure can include one or more material of plastic, fiber, cloth, paper, leather, rubber, and wood, but embodiments of the present disclosure are not limited thereto. For example, each of the first cover member 30 and the second cover member 50 can include the same material or different material. For example, each of the first cover member 30 and the second cover member 50 can be a polyimide film or a polyethylene terephthalate film, but embodiments of the present disclosure are not limited thereto.

One or more of the first cover member 30 and the second cover member 50 according to an embodiment of the present disclosure can include an adhesive member. For example, one or more of the first cover member 30 and the second cover member 50 can include adhesive layers 41 and 42 which is coupled or attached to the vibration generating part 10. For example, the adhesive layers 41 and 42 can include an electrical insulation material which has adhesiveness (or adhesive properties) and is capable of compression and decompression. For example, the first cover member 30 can include an adhesive layer 41 which is coupled or attached to the first surface 10*a* of the vibration generating part 10 or the first surface of the vibration part 10-1.

The first cover member 30 can be connected or coupled to the first surface 10*a* of the vibration generating part 10 or the first surface of the vibration part 10-1 by a first adhesive layer 41. For example, the first cover member 30 can be connected or coupled to the first surface 10*a* of the vibration generating part 10 or the first surface of the vibration part 10-1 by a film laminating process by the first adhesive layer 41.

The second cover member 50 can be connected or coupled to the second surface 10*b* of the vibration generating part 10 or the second surface of the vibration part 10-1 by a second adhesive layer 42. For example, the second cover member 50 can be connected or coupled to the second surface 10*b* of the vibration generating part 10 or the second surface of the vibration part 10-1 by a film laminating process by the second adhesive layer 42.

The first adhesive layer 41 can be disposed or filled between the first cover member 30 and the first surface 10*a* of the vibration generating part 10. The second adhesive layer 42 can be disposed or filled between the second cover member 50 and the second surface 10*b* of the vibration generating part 10. Accordingly, the vibration generating part 10 can be surrounded by the first adhesive layer 41 and the second adhesive layer 42. For example, the first adhesive layer 41 and the second adhesive layer 42 can be configured as one adhesive layer between the first cover member 30 and the second cover member 50, and thus, the vibration generating part 10 can be built-in or embedded between the first adhesive layer 41 and the second adhesive layer 42.

Each of the first adhesive layer 41 and the second adhesive layer 42 according to an embodiment of the present disclosure can include an electrical insulation material which has adhesiveness (or adhesive properties) and is capable of compression and decompression. For example, each of the first adhesive layer 41 and the second adhesive layer 42 can include an epoxy resin, an acrylic resin, a silicone resin, or a urethane resin, but embodiments of the present disclosure are not limited thereto.

The connection member 70 can be between the first surface 10*a* of the vibration generating part 10 and the first cover member 30 and can be electrically insulated from the first surface 10*a* of the vibration generating part 10 and electrically connected to the second surface 10*b* of the vibration generating part 10. For example, the connection member 70 can be electrically insulated from the upper electrode layer of the vibration generating part 10 and electrically connected to the lower electrode layer of the vibration generating part 10.

The connection member 70 can be electrically insulated from the first surface of the vibration part 10-1 (or the first electrode layer 13 of the vibration part 10-1) and electrically connected to the second surface of the vibration part 10-1 (or the second electrode layer 15 of the vibration part 10-1). For example, the connection member 70 can not electrically be connected to or contact the first electrode layer 13 of the vibration part 10-1 and can be electrically connected to the second electrode layer 15 of the vibration part 10-1. For example, the connection member 70 can be an internal connection line, a signal transfer line, a signal transfer member, an electrode connection member, a bridge line, an electrode bride line, or an electrode extension line.

The connection member 70 according to an embodiment of the present disclosure can be a conductive double-sided adhesive member. For example, the connection member 70 can be a conductive double-sided tape, a conductive double-sided adhesive pad, or a conductive double-sided cushion tape, but embodiments of the present disclosure are not limited thereto. The connection member 70 according to an embodiment of the present disclosure can include a metal layer 71 and tacky layers (or adhesive layers) 72 and 73.

The metal layer 71 of the connection member 70 can include a metal material. For example, the metal layer 71 can include copper (Cu) material, but embodiments of the present disclosure are not limited thereto.

The tacky layers 72 and 73 can include a conductive tacky material (or a conductive adhesive material). The tacky layers (or conductive tacky layers or adhesive layers) 72 and 73 according to an embodiment of the present disclosure can include a first tacky layer (or a first adhesive layer) 72 coupled or connected to a first surface of the metal layer 71 and a second tacky layer (or a second adhesive layer) 73 coupled or connected to a second surface of the metal layer 71. The tacky layers 72 and 73 according to another embodiment of the present disclosure can be configured to surround the metal layer 71. For example, the metal layer 71 can be embedded (or built-in) or inserted (or accommodated) into one of the tacky layers 72 and 73.

Each of the first and second tacky layers 72 and 73 of the connection member 70 according to an embodiment of the present disclosure can include or contain a conductive material. The conductive material can include a conductive particle, a conductive nano-particle, or a conductive nanowire, but embodiments of the present disclosure are not limited thereto.

The connection member 70 according to an embodiment of the present disclosure can include a first connection portion 70*a*, a second connection portion 70*b*, and a third connection portion 70*c*. For example, the connection member 70 can be divided into the first to third connection portions 70*a* to 70*c*, based on a position at which the vibration generating part 10 is disposed.

The first connection portion 70*a* of the connection member 70 can be electrically connected to the second surface 10*b* (or the lower electrode layer) of the vibration generating part 10. For example, the first connection portion 70*a* can be electrically connected to the second surface of the vibration part 10-1 (or the second electrode layer 15 of the vibration part 10-1). For example, the first connection portion 70*a* can be electrically connected to a portion of the second surface 10*b* of the vibration generating part 10 (or the second electrode layer 15 of the vibration part 10-1). The first connection portion 70*a* can be covered by the second adhesive layer 42 and can be spaced apart from or face an inner surface of the second cover member 50 with the second adhesive layer 42 therebetween. For example, the other portion, except a portion electrically connected to the first connection portion 70*a*, of the second electrode layer 15 of the vibration part 10-1 can be coupled or adhered to the inner surface of the second cover member 50 by the second adhesive layer 42. For example, the first connection portion 70*a* can be a first connection part, a first contact portion, a rear contact portion, a rear connection portion, or a rear local connection portion.

The first connection portion 70*a* according to an embodiment of the present disclosure can have a line shape which includes a certain thickness (or height), a width parallel to a first direction X, and a length parallel to a second direction Y intersecting with the first direction X. For example, the first direction X can be a short-side lengthwise direction, a widthwise direction, or a horizontal direction of the vibration generating part 10 or the vibration part 10-1, or an X-axis direction in an XYZ-axis direction. For example, the second direction Y can be a long-side lengthwise direction, a lengthwise direction, or a vertical direction of the vibration generating part 10 or the vibration part 10-1, or a Y-axis direction in an XYZ-axis direction.

According to an embodiment of the present disclosure, a width of the first connection portion 70*a* can be smaller than that of a width of the vibration generating part 10 or the vibration part 10-1. For example, the width of the first connection portion 70*a* can be less than half of a width of the vibration generating part 10 or the vibration part 10-1.

According to an embodiment of the present disclosure, a length of the first connection portion 70*a* can be smaller than that of a length of the vibration generating part 10 or the vibration part 10-1, but embodiments of the present disclosure are not limited thereto. For example, a length of the first connection portion 70*a* can be equal to that of the length of the vibration generating part 10 or the vibration part 10-1. For example, as a contact area between the first connection portion 70*a* and the second surface 10*b* of the vibration generating part 10 (or the second electrode layer 15 of the vibration part 10-1) increases, the uniformity of a driving signal applied to the vibration generating part 10 (or the vibration part 10-1) can increase.

The second connection portion 70*b* of the connection member 70 can be disposed on the first surface 10*a* of the vibration generating part 10. The second connection portion 70*b* can be bent from the third connection portion 70*c* toward a portion on the first surface 10*a* of the vibration generating part 10. For example, the second connection portion 70*b* can be disposed to be electrically insulated (or disconnected) from the first surface of the vibration part 10-1 (or the first electrode layer 13 of the vibration part 10-1). The second connection portion 70*b* can be spaced apart from the first surface 10*a* of the vibration generating part 10 (or the first electrode layer 13 of the vibration part 10-1). For example, the second connection portion 70*b* can be spaced apart from the first electrode layer 13 of the vibration part 10-1 so as not to electrically be connected (or short-circuited) to the first electrode layer 13 of the vibration part 10-1. Accordingly, the second connection portion 70*b* can receive the driving signal between the first surface 10*a* of the vibration generating part 10 and the first cover member 30. For example, the second connection portion 70*b* can be a second connection part, a second contact portion, a second front contact portion, a second front connection portion, a second extension portion, an end portion, one side portion, a second signal line connection portion, or a second signal line contact portion.

The second connection portion 70*b* according to an embodiment of the present disclosure can have a line shape which includes a certain thickness (or height), a width parallel to a first direction X, and a length parallel to a second direction Y intersecting with the first direction X. The second connection portion 70*b* can overlap with the first connection portion 70*a*. For example, the second connection portion 70*b* can face or overlap the first connection portion 70*a* with the vibration generating part 10 (or the vibration part 10-1) therebetween. For example, the second connection portion 70*b* can have a length which is different from or equal to that of the first connection portion 70*a*.

The third connection portion 70*c* of the connection member 70 can be connected or disposed between the first connection portion 70*a* and the second connection portion 70*b*. The third connection portion 70*c* can be bent from the first connection portion 70*a* toward one lateral surface (or an outer surface) of the vibration generating part 10. The third connection portion 70*c* can be disposed at one lateral surface (or an outer surface) of the vibration generating part 10 (or the vibration part 10-1). The third connection portion 70*c* can be configured to cover a portion of the one lateral surface (or the outer surface) of the vibration generating part 10 (or the vibration part 10-1). For example, the third connection portion 70*c* can be attached at the one lateral surface of the vibration generating part 10 (or the vibration part 10-1). For example, the third connection portion 70*c* can be a side portion, a side connection portion, a side connection line, or a first extension portion.

According to an embodiment of the present disclosure, as illustrated in FIG. 5, the third connection portion 70*c* can be extended from the first connection portion 70*a* and can be bent to the one lateral surface of the vibration generating part 10 (or the vibration part 10-1), and the second connection portion 70*b* can be extended from the third connection portion 70*c* and can be bent to the first surface 10*a* of the vibration generating part 10 (or the vibration part 10-1). Therefore, the connection member 70 can be disposed to surround a periphery portion of the first surface 10*a* of the vibration generating part 10, the one lateral surface of the vibration generating part 10, and a periphery portion of the second surface 10*b* of the vibration generating part 10, and thus, the connection member 70 can be electrically connected to the second surface 10*b* of the vibration generating part 10 or the second electrode layer 15 of the vibration part 10-1. Therefore, the second electrode layer 15 which is at the second surface of the vibration generating part 10 (or the vibration part 10-1) can be supplied with or receive the driving signal through the connection member 70 which is at the first surface of the vibration generating part 10 (or the vibration part 10-1). Accordingly, the second electrode layer 15 can be indirectly supplied with or receive the driving signal through the connection member 70.

The other portion, except at least a portion of the second connection portion 70*b*, of the first to third connection portions 70*a* to 70*c* of the connection member 70 can be covered by the adhesive layers 41 and 42, between the first cover member 30 and the second cover member 50.

The vibration apparatus 1 or the connection member 70 according to the first embodiment of the present disclosure can further include an insulation member 80.

The insulation member 80 can electrically insulate (or disconnect) the connection member 70 from an upper electrode layer or the first surface 10*a* of the vibration generating part 10. The insulation member 80 can be configured to prevent an electrical connection (or short circuit) between the first surface (or the first electrode layer 13) of the vibration part 10-1 and the connection member 70. The insulation member 80 can be configured to prevent an electrical connection (or short circuit) between the first electrode layer 13 of the vibration part 10-1 and the second connection portion 70*b* of the connection member 70. For example, the insulation member 80 can be an insulation pad, a single-sided insulation tape, a double-sided insulation tape, a pad, a short circuit prevention member, or a first insulation member.

The insulation member 80 according to an embodiment of the present disclosure can be disposed or interposed between the vibration generation part 10 (or the vibration part 10-1) and the connection member 70. For example, the insulation member 80 can be disposed or interposed between the first surface of the vibration generation part 10 (or the vibration part 10-1) and the second connection portion 70*b* of the connection member 70. For example, the insulation member 80 can be disposed or interposed between the first electrode layer 13 of the vibration part 10-1 and the second connection portion 70*b* of the connection member 70, and thus, can prevent an electrical connection (or short circuit) between the first electrode layer 13 of the vibration part 10-1 and the second connection portion 70*b* of the connection member 70, or can electrically insulate (or disconnect) the connection member 70 from the first electrode layer 13 of the vibration part 10-1.

According to an embodiment of the present disclosure, the insulation member 80 can be configured to have a size (or an area) which is greater than that of the second connection portion 70*b* of the connection member 70. For example, when the second connection portion 70*b* has a first width and a first length, the insulation member 80 can have a second width and a second length which are greater than the first width and the first length of the second connection portion 70*b*, respectively.

The insulation member 80 according to an embodiment of the present disclosure can be configured as a nonconductive material (or substance). For example, the insulation member 80 can include one or more material of plastic, fiber, cloth, paper, leather, rubber, and wood, but embodiments of the present disclosure are not limited thereto. For example, the insulation member 80 can be a polyimide film or a polyethylene terephthalate film, but embodiments of the present disclosure are not limited thereto.

According to an embodiment of the present disclosure, the insulation member 80 can be disposed or attached at the first surface of the vibration generating part 10 (or the vibration part 10-1) in an island shape or a line shape by an adhesive member. The insulation member 80 can be disposed in an island shape or a line shape at one corner portion of the first surface of the vibration generating part 10 (or the vibration part 10-1), but embodiments of the present disclosure are not limited thereto. For example, the insulation member 80 can be disposed at a portion of one periphery portion of the first surface of the vibration generating part 10 (or the vibration part 10-1).

The insulation member 80 according to an embodiment of the present disclosure can include a base insulation film and an adhesive member 81. The base insulation film can include one or more material of plastic, fiber, cloth, paper, leather, rubber, and wood. The adhesive member 81 can include an electrical insulation material which has adhesiveness (or adhesive properties) and is capable of compression and decompression. For example, the adhesive member 81 can include an epoxy resin, an acrylic resin, a silicone resin, or a urethane resin, but embodiments of the present disclosure are not limited thereto.

The insulation member 80 according to an embodiment of the present disclosure can support the connection member 70 with being disposed or attached at the first surface of the vibration generating part 10 (or the vibration part 10-1). For example, the second connection portion 70*b* of the connection member 70 can be disposed or attached at the insulation member 80 which is disposed or attached at the first surface of the vibration generating part 10 (or the vibration part 10-1).

The insulation member 80 according to another embodiment of the present disclosure can be integrated (or configured) as one body with the connection member 70. The connection member 70 can include the insulation member 80. For example, the insulation member 80 can be coupled to or integrated into the second connection portion 70*b* of the connection member 70. Therefore, the insulation member 80 can be disposed or attached at the first surface 10*a* of the vibration generating part 10 (or the first electrode layer 13 of the vibration part 10-1) with being coupled to the second connection portion 70*b* of the connection member 70.

The signal supply member 90 can be electrically connected to the vibration generating part 10 (or the vibration part 10-1), between the first surface 10*a* of the vibration generating part 10 and the first cover member 30. For example, the signal supply member 90 can be disposed between the first surface 10*a* of the vibration generating part 10 and the first cover member 30 and can be electrically connected to the first and second signal line connection portions electrically connected to the vibration part 10-1 at the first surface 10*a* of the vibration generating part 10. For example, the signal supply member 90 can be disposed between the first surface 10*a* of the vibration generating part 10 and the first cover member 30 and can be configured to be electrically connected to the first surface 10*a* of the vibration generating part 10 and the connection member 70. For example, the signal supply member 90 can be electrically connected to the connection member 70 on the insulation layer 80 and the first surface 10*a* of the vibration generating part 10. For example, the signal supply member 90 can be configured to supply different driving signals to an upper electrode layer of the vibration generating part 10 and the connection member 70. For example, the signal supply member 90 can be configured as a power supply member, a signal cable, a flexible cable, a flexible printed circuit cable, a flexible flat cable, a single-sided flexible printed circuit, a single-sided flexible printed circuit board, a flexible multilayer printed circuit, or a flexible multilayer printed circuit board, but embodiments of the present disclosure are not limited thereto.

The signal supply member 90 according to an embodiment of the present disclosure can include a base member 91, a first signal line 93, and a second signal line 95. For example, the signal supply member 90 can include a first signal line 93 electrically connected to the upper electrode layer (or the first electrode layer 13 of the vibration part 10-1) of the vibration generating part 10, and a second signal line 95 electrically connected to the connection member 70.

The base member 91 can include a transparent or opaque plastic material. For example, the base member 91 can be configured as any one or more of synthetic resins among a fluorine resin, a polyimide-based resin, a polyurethane-based resin, a polyester-based resin, a polyethylene-based resin, and a polypropylene-based resin, but embodiments of the present disclosure are not limited thereto. The base member 91 can be a base film or a base insulation film, but embodiments of the present disclosure are not limited thereto.

The base member 91 can have a certain width in a first direction X and can extend long along a second direction Y intersecting with the first direction X.

The first signal line 93 can be disposed at a first surface (or a rear surface) of the base member 91. For example, the first signal line 93 can be disposed at the first surface (or the rear surface) of the base member 91 in parallel with the second direction Y. The second signal line 95 can be disposed at the first surface of the base member 91. For example, the second signal line 95 can be disposed at the first surface of the base member 91 in parallel with the second direction Y and can be spaced apart from the first signal line 93. The first signal line 93 and the second signal line 95 can be disposed in parallel to each other at the first surface of the base member 91. For example, first signal line 93 and the second signal line 95 can be implemented in a line shape through patterning of a metal layer (or a conductive layer) formed or deposited at the first surface of the base member 91.

End portions (or distal end portions or one side) 93*a* and 95*a* of the first signal line 93 and the second signal line 95 of the signal supply member 90 can be electrically connected to the vibration generating part 10 in the same direction. For example, each of the end portions 93*a* and 95*a* of the first signal line 93 and the second signal line 95 of the signal supply member 90 can be electrically connected to the vibration generating part 10 with being disposed to face the first surface 10*a* (or the upper electrode layer) of the vibration generating part 10.

According to an embodiment of the present disclosure, the signal supply member 90 can be disposed between the first surface 10*a* of the vibration generating part 10 and the first cover member 30 and can be configured to be electrically connected to first and second signal line contact portions disposed at the first surface 10*a* of the vibration generating part 10 (or the first surface of the vibration part 10-1). For example, the end portions 93*a* and 95*a* of the first and second signal lines 93 and 95 of the signal supply member 90 can be respectively and electrically connected to first and second signal line connection portions provided at the first surface 10*a* (or the upper electrode layer) of the vibration generating part 10 or the first surface or the first electrode layer 13 of the vibration part 10-1.

According to an embodiment of the present disclosure, the first signal line connection portion can be a connection portion (or a contact portion) between the end portion 93*a* of the first signal line 93 and the first surface 10*a* (or the upper electrode layer) of the vibration generating part 10. For example, the first signal line connection portion can be a first front contact portion, a first front connection portion, or a first signal line contact portion. For example, the second signal line connection portion can be a connection portion (or a contact portion) between the end portion 95*a* of the second signal line 95 and the connection member 70. For example, the second signal line connection portion can be the second connection portion 70*b* of the connection member 70. The second signal line connection portion can be electrically connected to the second surface 10*b* (or the lower electrode layer) of the vibration generating part 10 or the second surface or the second electrode layer 15 of the vibration part 10-1 through the connection member 70.

The end portion 93*a* of the first signal line 93 can be electrically connected to the first surface 10*a* (or the upper electrode layer) of the vibration generating part 10, between the first surface 10*a* of the vibration generating part 10 and the first cover member 30. For example, the end portion 93*a* of the first signal line 93 can be directly connected to or directly contact the first surface or the first electrode layer 13 of the vibration part 10-1, but embodiments of the present disclosure are not limited thereto. For example, the end portion 93*a* of the first signal line 93 can be electrically connected to the first surface or the first electrode layer 13 of the vibration part 10-1 through a conductive double-sided tape. Accordingly, a driving signal (or a first driving signal) supplied from a vibration driving circuit can be supplied to the upper electrode layer of the vibration generating part 10 through the first signal line 93. For example, the first driving signal can be supplied to the first electrode layer 13 of the vibrating part 10-1 through the first signal line 93.

The end portion 95*a* of the second signal line 95 can be electrically connected to the first surface 10*a* of the vibration generating part 10, between the first surface 10*a* of the vibration generating part 10 and the first cover member 30. For example, the end portion 95*a* of the second signal line 95 can be connected to or contact the second connection portion 70*b* of the connection member 70 which is at the first surface 10*a* of the vibration generating part 10. For example, the end portion 95*a* of the second signal line 95 can be electrically connected to the second tacky layer 73 which is at the second connection portion 70*b* of the connection member 70. For example, the end portion 95*a* of the second signal line 95 can be electrically connected to the lower electrode layer of the vibration generating part 10 (or the second electrode layer 15 of the vibration part 10-1) through the metal layer 71 and the tacky layers 72 and 73 of the second connection portion 70*b*. Accordingly, a driving signal (or a second driving signal) supplied from a vibration driving circuit can be supplied to the lower electrode layer of the vibration generating part 10 through the second signal line 95 and the connection member 70. For example, the second driving signal can be supplied to the second electrode layer 15 of the vibrating part 10-1 through the second signal line 95 and the connection member 70.

The signal supply member 90 according to an embodiment of the present disclosure can further include an insulation member 97.

The insulation member 97 can be disposed at the first surface of the base member 91 to cover each of the first signal line 93 and the second signal line 95 other than the end portion (or one side) of the signal supply member 90. The insulation member 97 can be a protective layer, a coverlay, a coverlayer film, a cover film, or a cover insulation film, but embodiments of the present disclosure are not limited thereto.

An end portion (or one side) of the signal supply member 90 including an end portion (or one side) 91*a* of the base film 91 illustrated by a dotted line in FIGS. 3 to 5 can be inserted between the first surface 10*a* of the vibration generating part 10 and the first cover member 30 and can be inserted (or accommodated) and fixed between the first surface 10*a* of the vibration generating part 10 and the first cover member 30 by a first adhesive layer 41 formed at the first cover member 30. For example, the end portion (or one side) of the signal supply member 90 inserted between the first surface 10*a* of the vibration generating part 10 and the first cover member 30 can be inserted (or accommodated) and fixed between the first surface 10*a* of the vibration generating part 10 and the first cover member 30 by a film laminating process which uses a first adhesive layer 41 formed at the first cover member 30 and/or a second adhesive layer 42 formed at the second cover member 50. Accordingly, the end portion (or one side) 93*a* of the first signal line 93 can be maintained with being electrically connected to the upper electrode layer of the vibration generating part 10 (or the first electrode layer 13 of the vibration part 10-1), and the end portion (or one side) 95*a* of the second signal line 95 can be maintained with being electrically connected to the connection member 70 (or the second connection portion 70*b* of the connection member 70). Further, the end portion (or one side) of the signal supply member 90 can be inserted (or accommodated) and fixed between the first surface 10*a* of the vibration generating part 10 and the first cover member 30, and thus, a contact defect between the vibration generating part 10 and the signal supply member 90 caused by the movement of the signal supply member 90 can be prevented.

In the signal supply member 90 according to an embodiment of the present disclosure, the end portion (or one side) 91*a* of the base film 91 illustrated by a dotted line in FIGS. 3 to 5 can be removed. For example, each of the end portion 93*a* of the first signal line 93 and the end portion 95*a* of the second signal line 95 can be exposed at the outside without being supported or covered by the end portion 91*a* of the base film 91. For example, the end portion 93*a* of the first signal line 93 and the end portion 95*a* of the second signal line 95 can protrude to have a certain length from an end 91*e* of the base film 91. Accordingly, each of the end portion 93*a* of the first signal line 93 and the end portion 95*a* of the second signal line 95 can be individually or independently bent.

The end portion 93*a* of the first signal line 93 which is not supported by the base film 91 can be a first protrusion line, a first protrusion electrode, a first conductive line, a first conductive protrusion line, a first conductive wire, a first flexible protrusion line, a first flexible protrusion electrode, a first flexible conductive line, a first flexible conductive protrusion line, or a first flexible conductive wire. For example, the end portion 95*a* of the second signal line 95 which is not supported by the base film 91 can be a second protrusion line, a second protrusion electrode, a second conductive line, a second conductive protrusion line, a second conductive wire, a second flexible protrusion line, a second flexible protrusion electrode, a second flexible conductive line, a second flexible conductive protrusion line, or a second flexible conductive wire. Accordingly, the signal supply member 90 according to another embodiment of the present disclosure can include the base film 91, the first and second signal lines 93 and 95, the first and second conductive protrusion lines 93*a* and 95*a*, and an insulation layer 97.

Each of the first and second signal lines 93 and 95 can be disposed between only the base film 91 and the insulation layer 97.

Each of the first and second conductive protrusion lines 93*a* and 95*a* can extend from each of the first and second signal lines 93 and 95 to pass through the end 91*e* of the base film 91. Each of the first and second conductive protrusion lines 93*a* and 95*a* can be disposed and inserted (or accommodated) between the first surface 10*a* of the vibration generating part 10 and the first cover member 30. The first conductive protrusion line 93*a* can be electrically connected to the upper electrode layer of the vibration generating part 10 (or the first electrode layer 13 of the vibration part 10-1), between the first surface 10*a* of the vibration generating part 10 and the first cover member 30. The second conductive protrusion line 95*a* can be electrically connected to the connection member 70 (or the second connection portion

70*b* of the connection member 70), between the first surface 10*a* of the vibration generating part 10 and the first cover member 30.

In FIGS. 3 to 5, only the first and second conductive protrusion lines 93*a* and 95*a* are disposed or inserted (or accommodated) between the first surface 10*a* of the vibration generating part 10 and the first cover member 30 when the end portion 91*a* of the base film 91 illustrated by a dotted line is removed, but embodiments of the present disclosure are not limited thereto. For example, a portion of the base film 91 can be disposed or inserted (or accommodated) between the first surface 10*a* of the vibration generating part 10 and the first cover member 30 together with the first and second conductive protrusion lines 93*a* and 95*a*. For example, a portion of the base film 91 and a portion of the insulation layer 97 can be disposed or inserted (or accommodated) between the first surface 10*a* of the vibration generating part 10 and the first cover member 30 together with the first and second conductive protrusion lines 93*a* and 95*a*.

According to an embodiment of the present disclosure, a portion of the signal supply member 90 can be disposed or inserted (or accommodated) between the first surface 10*a* of the vibration generating part 10 and the first cover member 30, and thus, the signal supply member 90 can be integrated (or configured) as one body with the vibration generating part 10, whereby the signal supply member 90 and the vibration generating part 10 can be configured as one part (or an element or a one component). For example, the vibration apparatus 1 according to the first embodiment of the present disclosure can be a vibration apparatus which is integrated with the signal supply member 90.

According to the vibration apparatus 1 according to the first embodiment of the present disclosure, the first signal line 93 and the second signal line 95 of the signal supply member 90 can be integrated (or configured) as one body with the vibration generating part 10, and thus, a soldering process for an electrical connection between the vibration generating part 10 and the signal supply member 90 cannot be needed, whereby a manufacturing process and a structure of the vibration apparatus 1 can be simplified. Also, the first signal line 93 and the second signal line 95 of the signal supply member 90 can be electrically connected to the vibration generating part 10 in the same direction, and thus, a manufacturing process and a structure of the signal supply member 90 can be simplified.

According to the vibration apparatus 1 according to the first embodiment of the present disclosure, because the first signal line 93 and the second signal line 95 of the signal supply member 90 is disposed together between the first surface 10*a* of the vibration generating part 10 and the first cover member 30, a step height (or a height difference) H1 between the first signal line 93 and the second signal line 95 can be reduced, and thus, the crack or damage of the vibration generating part 10 can be prevented from occurring in a film laminating process, thereby increasing a reliability of the vibration apparatus 1.

Figure 6:
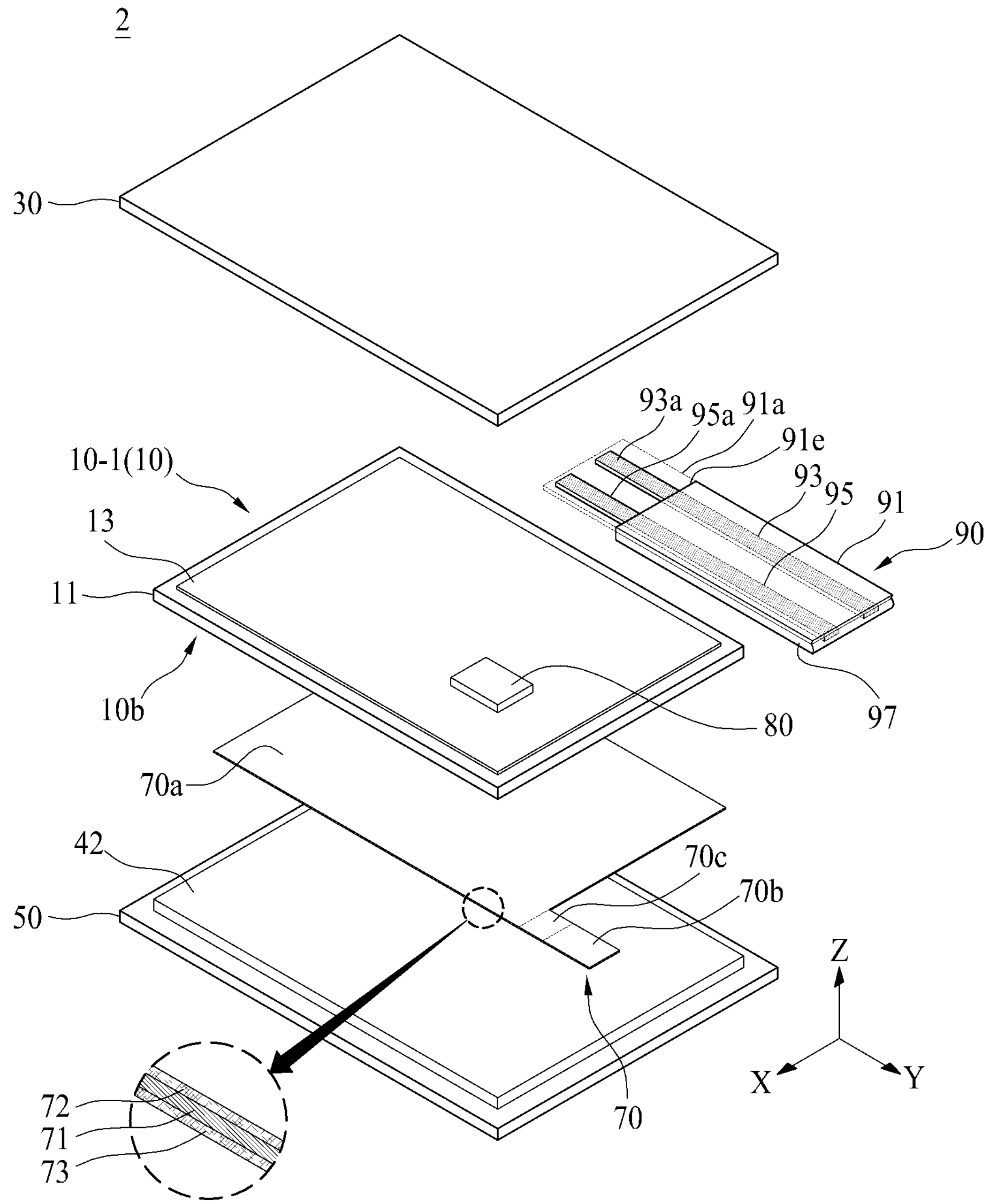
FIG. 6 is an exploded perspective view of a vibration apparatus according to the second embodiment of the present disclosure.

FIG. 6 is an exploded perspective view of a vibration apparatus according to a second embodiment of the present disclosure. FIG. 6 illustrates an embodiment implemented by modifying the connection member 70 in the vibration apparatus 1 according to the first embodiment of the present disclosure described above with reference to FIGS. 1 to 5. Hereinafter, in describing the vibration apparatus according to the second embodiment of the present disclosure, elements differing from the elements of the vibration apparatus 1 according to the first embodiment of the present disclosure will be mainly described.

With reference to FIG. 6, in the vibration apparatus 2 according to the second embodiment of the present disclosure, a connection member 70 can be configured to be connected to an entire second surface 10*b* of a vibration generating part 10 (or a second surface of a vibration part 10-1). For example, except for that the connection member 70 of the vibration apparatus 2 according to the second embodiment of the present disclosure is connected to half or more of the second surface 10*b* of the vibration generating part 10 (or the second surface of the vibration part 10-1), the connection member 70 of the vibration apparatus 2 can be substantially the same as the connection member 70 described above with reference to FIGS. 1 to 5.

The connection member 70 can include a first connection portion 70*a*, a second connection portion 70*b*, and a third connection portion 70*c*. For example, the connection member 70 can be divided into the first to third connection portions 70*a* to 70*c*, based on a position at which a vibration generating part 10 is disposed.

Except for that the first connection portion 70*a* of the connection member 70 enlarges or extends to be electrically connected to all or half or more of the second electrode layer 15 of the vibration part 10-1, the first connection portion 70*a* of the connection member 70 of the vibration apparatus 2 can be substantially the same as the first connection portion 70*a* of the connection member 70 described above with reference to FIGS. 1 to 5, and thus, repeated descriptions thereof are omitted or will be briefly given below. For example, descriptions of the first connection portion 70*a* illustrated in FIGS. 1 to 5 can be included in descriptions of the first connection portion 70*a* illustrated in FIG. 6.

According to an embodiment of the present disclosure, the first connection portion 70*a* of the connection member 70 can be configured to be electrically connected to half or more of the other portion, except a periphery portion, of a second surface 10*b* (or a lower electrode layer) of the vibration generating part 10. For example, the first connection portion 70*a* can be configured to be electrically connected to half or more of the other portion, except a periphery portion, of a second surface of the vibration part 10-1 (or a second electrode layer 15 of the vibration part 10-1.

According to another embodiment of the present disclosure, the first connection portion 70*a* of the connection member 70 can be electrically connected to all of a second surface of a vibration part 10-1 (or a second electrode layer 15 of the vibration part 10-1). For example, the first connection portion 70*a* can be electrically connected to all of the second surface of the vibration part 10-1 (or a second electrode layer 15 of the vibration part 10-1).

The first connection portion 70*a* can be covered by a second adhesive layer 42 and can be spaced apart from or face an inner surface of the second cover member 50 with the second adhesive layer 42 therebetween. For example, a periphery portion, except a portion electrically connected to the first connection portion 70*a*, of the second electrode layer 15 of the vibration part 10-1 can be coupled or adhered to the inner surface of the second cover member 50 by the second adhesive layer 42. For example, a side surface (or a lateral surface) of the first connection portion 70*a* can be surrounded by the second adhesive layer 42.

The third connection portion 70*c* of the connection member 70 can extend and be bent to one periphery portion (or one corner portion) of the first connection portion 70*a*. The third connection portion 70*c* can be disposed at one lateral surface (or an outer surface) of the vibration generating part 10 (or the vibration part 10-1). The third connection portion 70*c* can be configured to cover a portion of the one lateral surface (or the outer surface) of the vibration generating part 10 (or the vibration part 10-1). The third connection portion 70*c* can be attached at the one lateral surface (or the outer surface) of the vibration generating part 10 (or the vibration part 10-1).

The second connection portion 70*b* of the connection member 70 can extend from the third connection portion 70*c* and can be bent toward an insulation member 80. The second connection portion 70*b* can be disposed on the insulation member 80. For example, the second connection portion 70*b* can be disposed on the insulation member 80, and thus, can be electrically insulated (or disconnected) from a first surface of the vibration part 10-1 (or a first electrode layer 13 of the vibration part 10-1). The second connection portion 70*b* of the connection member 70 can be electrically connected to a second signal line 95 or a second conductive protrusion line 95*a* of a signal supply member 90.

The vibration apparatus 2 according to the second embodiment of the present disclosure have the same effect as that of the vibration apparatus 1 according to the first embodiment of the present disclosure or can be implemented as a vibration apparatus having the same effect. Also, in the vibration apparatus 2 according to the second embodiment of the present disclosure, as a contact area between the second surface 10*b* (or the lower electrode layer) of the vibration generating part 10 or the second electrode layer 15 of the vibration part 10-1 and the connection member 70 increases, the uniformity of a driving signal applied to the second surface 10*b* (or the lower electrode layer) of the vibration generating part 10 or the second electrode layer 15 of the vibration part 10-1 can be enhanced, and thus, the vibration efficiency or vibration characteristic of the vibration apparatus 2 can increase, thereby increasing a sound pressure level.

Figure 7:
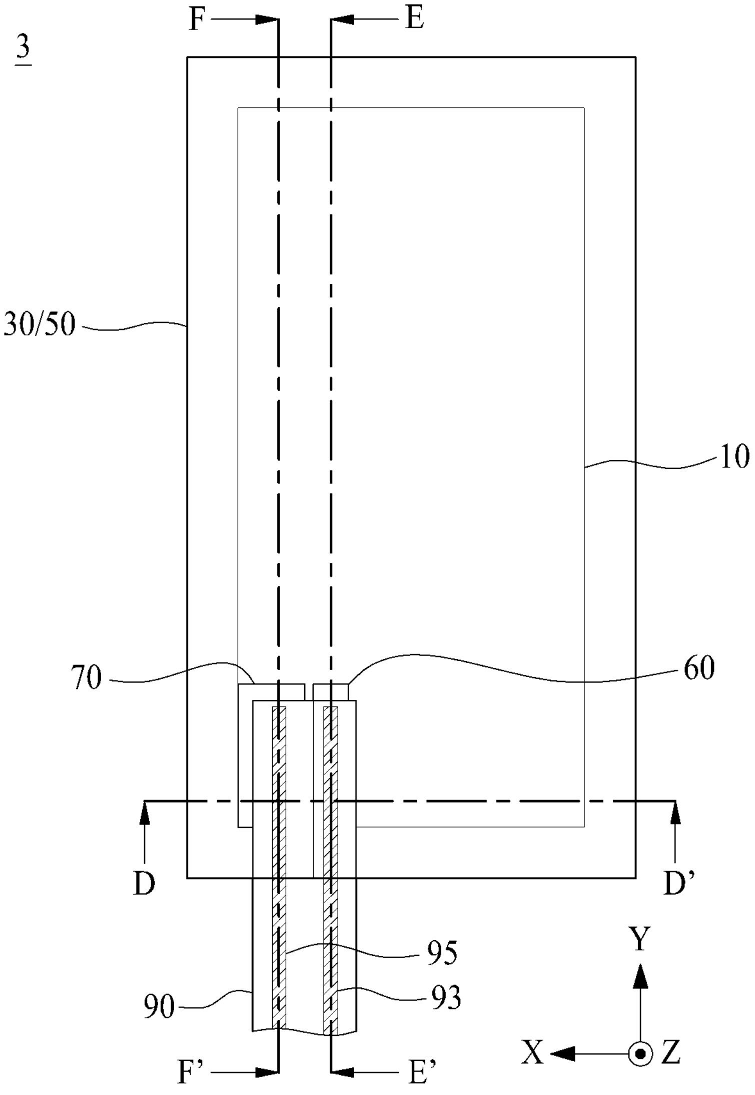
FIG. 7 illustrates a vibration apparatus according to a third embodiment of the present disclosure.
Figure 8:
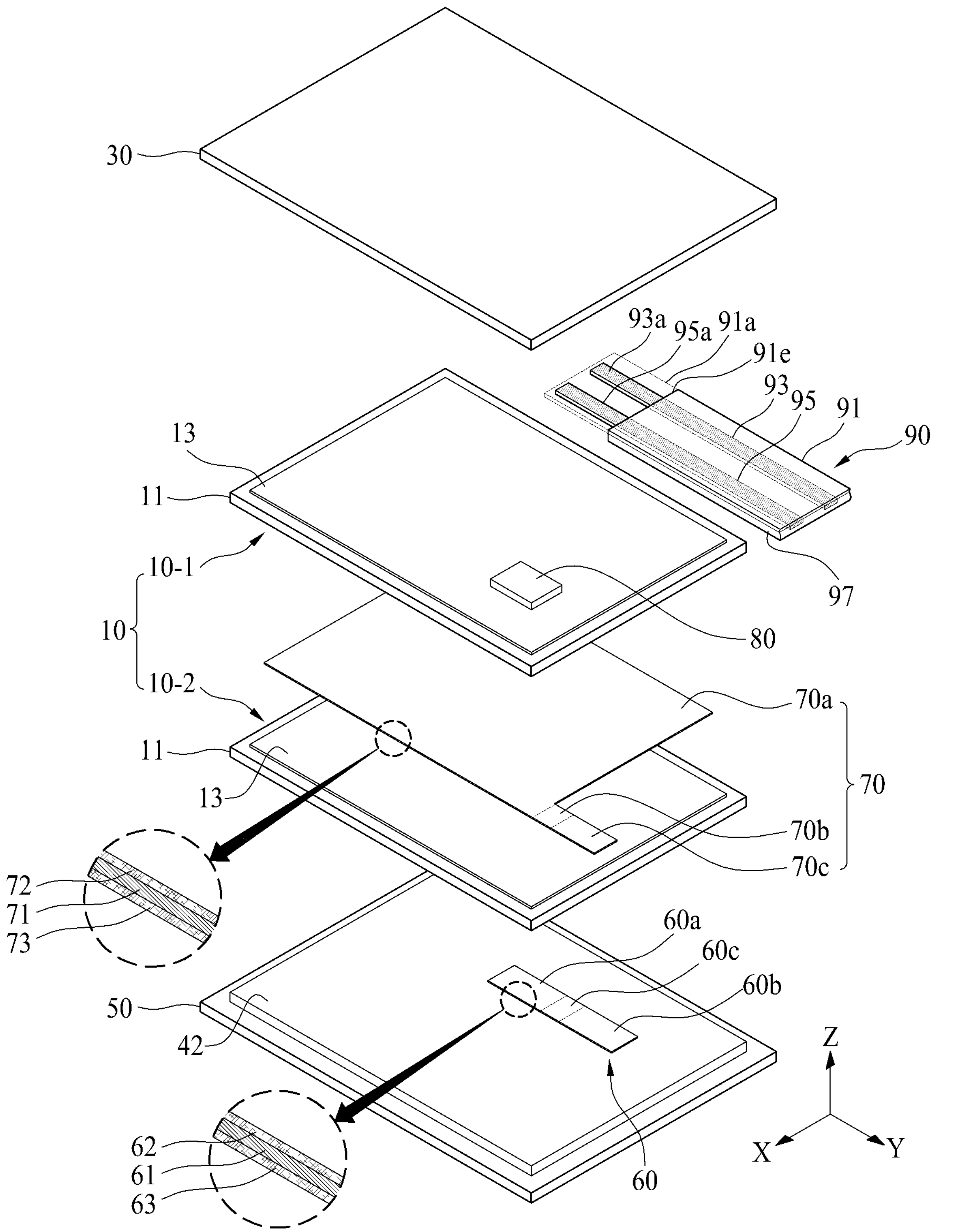
FIG. 8 is an exploded perspective view of the vibration apparatus illustrated in FIG. 7 according to the third embodiment of the present disclosure.
Figure 9:
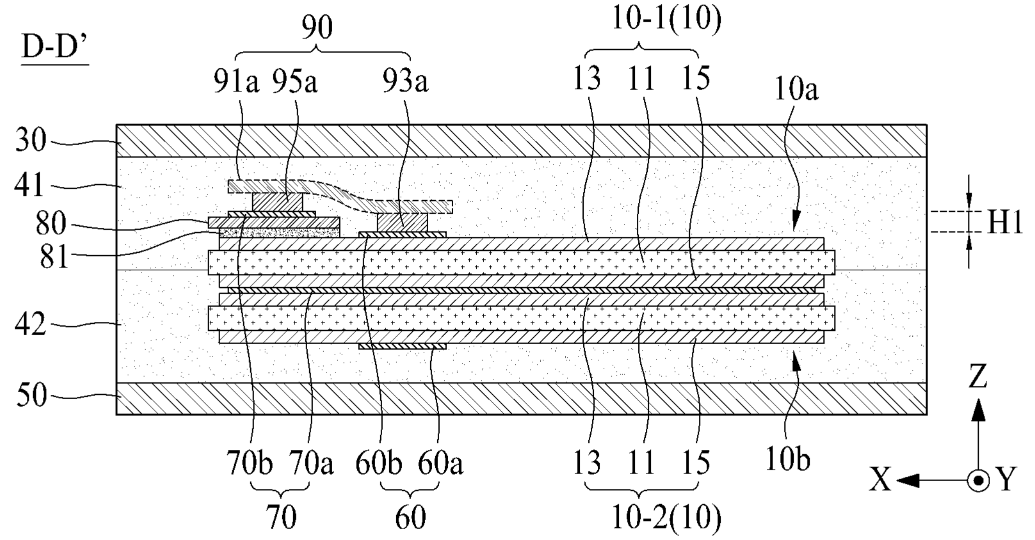
FIG. 9 is a cross-sectional view taken along line D-D' illustrated in FIG. 7 according to the third embodiment of the present disclosure.
Figure 10:
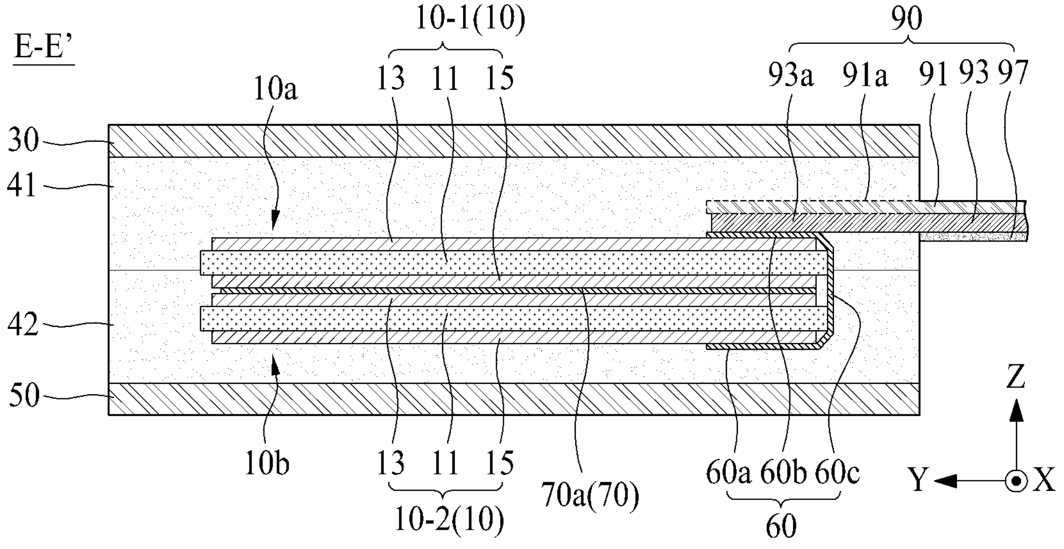
FIG. 10 is a cross-sectional view taken along line E-E' illustrated in FIG. 7 according to the third embodiment of the present disclosure.
Figure 11:
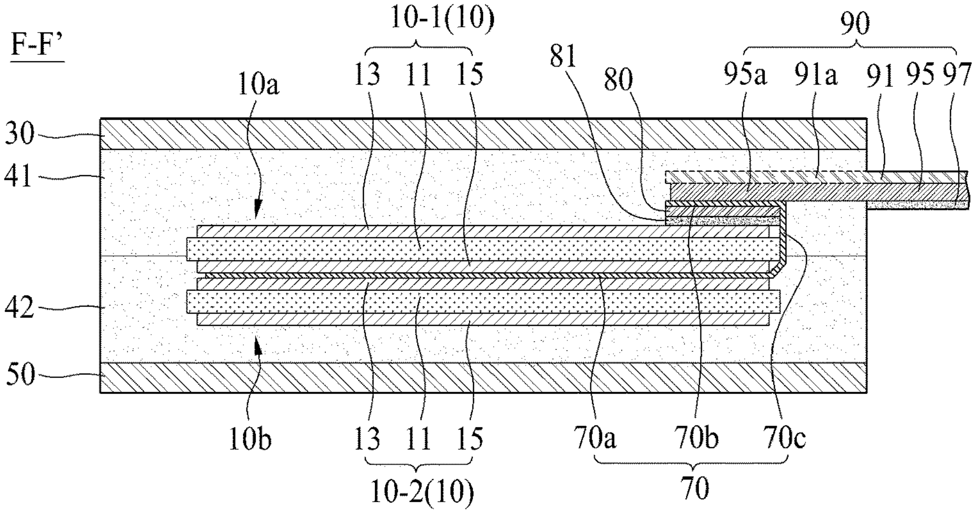
FIG. 11 is a cross-sectional view taken along line F-F' illustrated in FIG. 7 according to the third embodiment of the present disclosure.
Figure 12:
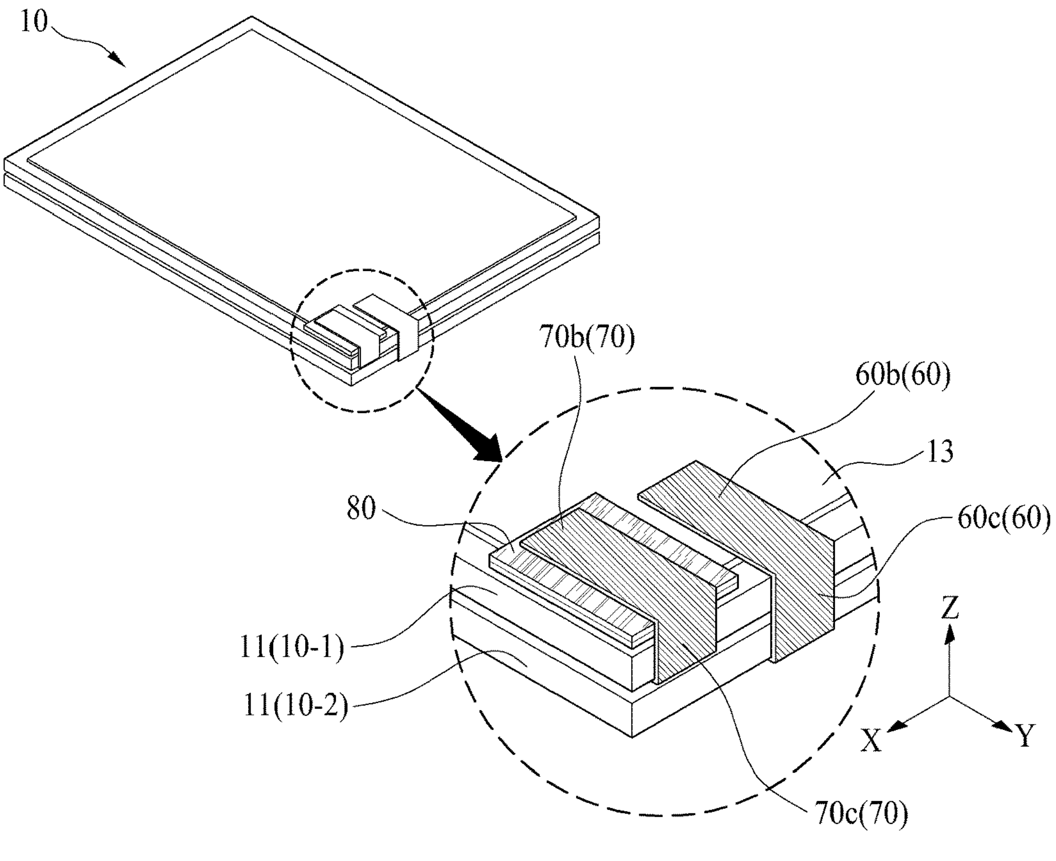
FIG. 12 is a perspective view illustrating an arrangement structure of each of the first and second connection members illustrated in FIG. 8.

FIG. 7 illustrates a vibration apparatus according to a third embodiment of the present disclosure. FIG. 8 is an exploded perspective view of the vibration apparatus illustrated in FIG. 7 according to the third embodiment of the present disclosure. FIG. 9 is a cross-sectional view taken along line D-D' illustrated in FIG. 7 according to the third embodiment of the present disclosure. FIG. 10 is a cross-sectional view taken along line E-E' illustrated in FIG. 7 according to the third embodiment of the present disclosure. FIG. 11 is a cross-sectional view taken along line F-F' illustrated in FIG. 7 according to the third embodiment of the present disclosure. FIG. 12 is a perspective view illustrating an arrangement structure of each of the first and second connection members illustrated in FIG. 8.

With reference to FIGS. 7 to 11, the vibration apparatus 3 according to the third embodiment of the present disclosure can include a vibration generating part 10, a first cover member 30, a second cover member 50, a first connection member 60, a second connection member 70, and a signal supply member 90.

The vibration generating part 10 can be configured to vibrate based on a driving signal (or a sound signal or a voice signal) supplied through the signal supply member 90. For example, the vibration generating part 10 can include a first surface 10*a* and a second surface 10*b* opposite to the first surface 10*a*.

The vibration generating part 10 can include a plurality of vibration parts 10-1 and 10-2 which are stacked or overlapped with each other. For example, the vibration generating part 10 can include a plurality of vibration parts 10-1 and 10-2 which are stacked or piled up each other. For example, the vibration generating part 10 can include first and second vibration parts 10-1 and 10-2 which are stacked or overlapped with each other.

According to an embodiment of the present disclosure, the first vibration part 10-1 can be stacked or disposed on the second vibration part 10-2. For example, a first surface 10*a* of the vibration generating part 10 can be a first surface (or an upper surface) of the first vibration part 10-1, and a second surface of the vibration generating part 10*b* can be a second surface (or a lower surface) of the second vibrating part 10-2.

Each of the first and second vibration parts (or the plurality of vibration parts) 10-1 and 10-2 according to an embodiment of the present disclosure can include a vibration layer 11, a first electrode layer 13, and a second electrode layer 15. The vibration layer 11, the first electrode layer 13, and the second electrode layer 15 of each of the first and second vibration parts (or the plurality of vibration parts) 10-1 and 10-2 can be substantially the same as the vibration layer 11, the first electrode layer 13, and the second electrode layer 15 of the vibration generating part 10 described above with reference to FIGS. 1 to 5, and thus, the repetitive descriptions thereof are omitted or will be briefly given. For example, descriptions of the vibration layer 11, the first electrode layer 13, and the second electrode layer 15 described above with reference to FIGS. 1 to 5 can be included in descriptions of the vibration layer 11, the first electrode layer 13, and the second electrode layer 15 illustrated in FIGS. 9 to 11.

The first electrode layer 13 of the first vibration part 10-1 can be a first surface 10*a* or an upper electrode layer of the vibration generating part 10. The second electrode layer 15 of the first vibration part 10-1 can be disposed on the first electrode layer 13 of the second vibration part 10-2. The first electrode layer 13 of the second vibration part 10-2 can be disposed under the second electrode layer 15 of the first vibration part 10-1. The second electrode layer 15 of the second vibration part 10-2 can be a second surface 10*b* or a lower electrode layer of the vibration generating part 10. The second electrode layer 15 of the first vibration part 10-1 and the first electrode layer 13 of the second vibration part 10-2 can each be an inner electrode layer, a middle electrode layer, and a common electrode layer of the vibration generating part 10.

The vibration layer 11 of the first vibration part 10-1 and the vibration layer 11 of the second vibration part 10-2 can be polarized (or poling) in a same direction, or can be polarized in opposite directions. For example, a polarization direction (or a poling direction) formed in the vibration layer 11 of the first vibration part 10-1 can be an opposite direction of a polarization direction (or a poling direction) formed in the vibration layer 11 of the second vibration part 10-2. According to an embodiment of the present disclosure, when the polarization direction (or a poling direction) formed in the vibration layer 11 of the first vibration part 10-1 is the opposite direction of the polarization direction (or a poling direction) formed in the vibration layer 11 of the second vibration part 10-2, the first vibration part 10-1 and the second vibration part 10-2 can be displaced (or vibrate or driven) in a same direction, whereby a vibration width (or a displacement width) of the vibration generating part 10 can be maximized and thus a sound pressure level can be enhanced.

The first cover member 30 can be configured to cover a first surface 10*a* (or an upper electrode layer) of the vibration generating part 10 or the first electrode layer 13 of the first vibration part 10-1. The first cover member 30 can be connected to or coupled to the first surface 10*a* (or the upper electrode layer) of the vibration generating part 10 or the first electrode layer 13 of the first vibration part 10-1 by a first adhesive layer 41. Except for that the first cover member 30 is configured to cover the first surface 10*a* of the vibration generating part 10 or the first electrode layer 13 of the first vibration part 10-1, the first cover member 30 can be substantially the same as the first cover member 30 described above with reference to FIGS. 1 to 5, and thus, the repetitive descriptions thereof can be omitted or may be briefly provided. For example, descriptions of the first cover member 30 illustrated in FIGS. 1 to 5 can be included in descriptions of the first cover member illustrated in FIGS. 7 to 11.

The second cover member 50 can be configured to cover the second surface 10*b* (or the lower electrode layer) of the vibration generating part 10 or the second electrode layer 15 of the second vibration part 10-2. The second cover member 50 can be connected to or coupled to the second surface 10*b* (or the lower electrode layer) of the vibration generating part 10 or the second electrode layer 15 of the second vibration part 10-2 by a second adhesive layer 42. Except for that the second cover member 50 is configured to cover the second surface 10*b* of the vibration generating part 10 or the second electrode layer 15 of the second vibration part 10-2, the second cover member 50 can be substantially the same as the second cover member 50 described above with reference to FIGS. 1 to 5, and thus, the repetitive descriptions thereof can be omitted or may be briefly provided. For example, descriptions of the second cover member 50 illustrated in FIGS. 1 to 5 can be included in descriptions of the second cover member 50 illustrated in FIGS. 7 to 11.

The first adhesive layer 41 can be disposed or filled between the first cover member 30 and the first surface 10*a* of the vibration generating part 10. The second adhesive layer 42 can be disposed or filled between the second cover member 50 and the second surface 10*b* of the vibration generating part 10. Accordingly, the vibration generating part 10 can be surrounded by the first adhesive layer 41 and the second adhesive layer 42. For example, the first adhesive layer 41 and the second adhesive layer 42 can be configured as one adhesive layer between the first cover member 30 and the second cover member 50, and thus, the vibration generating part 10 can be built-in or embedded between the first adhesive layer 41 and the second adhesive layer 42.

The first connection member 60 can be disposed between the first surface 10*a* of the vibration generating part 10 and the first cover member 30 and can configure a first signal line connection portion of the vibration generating part 10. The first connection member 60 can be between the first surface 10*a* of the vibration generating part 10 and the first cover member 30 and can be electrically connected to the first surface 10*a* and the second surface 10*b* of the vibration generating part 10. For example, the first connection member 60 can be electrically connected to the upper electrode layer and the lower electrode layer of the vibration generating part 10. For example, the first connecting member 60 can be electrically connected to the first surface of the first vibration part 10-1 (or the first electrode layer 13 of the first vibration part 10-1) and the second surface of the second vibration part 10-2 (or the second electrode layer 15 of the second vibration part 10-2). For example, the first connection member 60 can be electrically connected to each of the first electrode layer 13 of the first vibration part 10-1 and the second electrode layer 15 of the second vibration part 10-2, or can be connected thereto in common. For example, the first connection member 60 can be a first connection line, a first electrode connection line, a first internal connection line, a first signal transfer line, a first signal transfer member, a first electrode connection member, a first electrode connection means, a first bridge line, a first electrode bridge line, or a first electrode extension line.

The first connection member 60 according to an embodiment of the present disclosure can include a conductive double-sided adhesive member. For example, the first connection member 60 can include a conductive double-sided tape, a conductive double-sided adhesive pad, or a conductive double-sided cushion tape, but embodiments of the present disclosure are not limited thereto.

The first connection member 60 according to an embodiment of the present disclosure can include a metal layer 61 and tacky layers (or adhesive layers) 62 and 63. The metal layer 61 and the tacky layers (or conductive tacky layers or adhesive layers) 62 and 63 of the first connection member 60 can be substantially the same as the metal layer 71 and the tacky layers (or adhesive layers) 72 and 73 of the connection member 70 described above with reference to FIGS. 1 to 5, and thus, the repetitive descriptions thereof can be omitted or may be briefly provided. For example, descriptions of the connection member 70 illustrated in FIGS. 1 to 6 can be included in descriptions of the first connection member 60 illustrated in FIGS. 7 to 12.

The first connection member 60 according to an embodiment of the present disclosure can include a first connection portion 60*a*, a second connection portion 60*b*, and a third connection portion 60*c*. For example, the first connection member 60 can be divided into the first to third connection portions 60*a* to 60*c*, based on a position at which the vibration generating part 10 is disposed. Except for that the first connection member 60 is connected to the first electrode layer 13 of the first vibration part 10-1 and the second electrode layer 15 of the second vibration part 10-2 in common, the first connection member 60 can be substantially the same as the connection member 70 described above with reference to FIGS. 1 to 6, and thus, the repetitive descriptions thereof can be omitted or will be briefly given below.

As illustrated in FIGS. 8 to 10 and 12, the first connection portion 60*a* of the first connection member 60 can be electrically connected to the second surface 10*b* (or the lower electrode layer) of the vibration generating part 10. The first connection portion 60*a* can be electrically connected to a portion of the second surface 10*b* of the vibration generating part 10 (or the second electrode layer 15 of the second vibration part 10-2). For example, as described above with reference to FIG. 6, the first connection portion 60*a* can be electrically connected to the other part, except a periphery portion, of the second surface 10*b* of the vibration generating part 10 (or the second electrode layer 15 of the second vibration part 10-2), and thus, the repetitive descriptions thereof are omitted or will be briefly given. For example, the first connection portion 60*a* can be a first connection portion, a first contact portion, a rear contact portion, a rear connection portion, or a rear local connection portion. For example, except for that the first connection portion 70*a* is connected to the second electrode layer 15 of the second vibration part 10-2 instead of the second electrode layer 15 of the vibration part 10-1, the descriptions of the first connection portion 70*a* illustrated in FIGS. 1 to 6 can be included in descriptions of the first connection portion 60*a* illustrated in FIGS. 7 to 12.

As illustrated in FIGS. 8 to 10 and 12, the second connection portion 60*b* of the first connection member 60 can be disposed on the first surface 10*a* of the vibration generating part 10. The second connection portion 60*b* can be bent from the third connection portion 60*c* toward a portion on the first surface 10*a* of the vibration generating part 10. For example, the second connection portion 60*b* can be disposed to be electrically insulated (or disconnected) from the first surface of the first vibration part 10-1 (or the first electrode layer 13 of the first vibration part 10-1). The second connection portion 60*b* can be spaced apart from the first surface 10*a* of the vibration generating part 10 (or the first electrode layer 13 of the first vibration part 10-1). For example, the second connection portion 60*b* can be disposed spaced apart from the first electrode layer 13 of the first vibration part 10-1 so as not to electrically be connected (or short-circuited) to the first electrode layer 13 of the first vibration part 10-1. For example, the second connection portion 60*b* can configure a first signal line connection portion which is disposed on the first surface 10*a* of the vibration generating part 10. For example, the second connection portion 60*b* can be a second connection portion, a second contact portion, a first front contact portion, a first front connection portion, a second extension portion, a first end portion, a first signal line connection portion, or a first signal line contact portion. For example, descriptions of the second connection portion 70*b* illustrated in FIGS. 1 to 6 can be included in descriptions of the second connection portion 60*b* illustrated in FIGS. 7 to 12.

As illustrated in FIGS. 8, 10, and 12, the third connection portion 60*c* of the first connection member 60 can be connected or disposed between the first connection portion 60*a* and the second connection portion 60*b*. The third connection portion 60*c* can be bent from the first connection portion 60*a* toward one lateral surface (or an outer surface) of the vibration generating part 10. The third connection portion 60*c* can be disposed at one lateral surface (or the outer surface) of the vibration generating part 10 or at one lateral surface (or an outer surface) of the first and second vibration parts 10-1 and 10-2. The third connection portion 60*c* can be configured to cover a portion of the one lateral surface (or the outer surface) of the vibration generating part 10 (or the first and second vibration parts 10-1 and 10-2). The third connection portion 60*c* can be attached at the one lateral surface (or the outer surface) of the vibration generating part 10 (or the first and second vibration parts 10-1 and 10-2). For example, the third connection portion 60*c* can be a third connection part, a first side portion, a first side connection portion, or a first side connection line. For example, descriptions of the third connection portion 70*c* illustrated in FIGS. 1 to 6 can be included in descriptions of the third connection portion 60*c* illustrated in FIGS. 7 to 12.

The second connection member 70 can be disposed between the first surface 10*a* of the vibration generating part 10 and the first cover member 30 and can configure a second signal line connection portion of the vibration generating part 10. The second connection member 70 can be between the first surface 10*a* of the vibration generating part 10 and the first cover member 30 and can be electrically connected to an inner electrode layer of the vibration generating part 10. For example, the second connection member 70 can be connected to the second electrode layer 15 of the first vibration part 10-1 and the first electrode layer 13 of the second vibration part 10-2 in common and can configure the second signal line connection portion of the vibration generating part 10, between the first surface 10*a* of the vibration generating part 10 and the first cover member 30.

The second connection member 70 according to an embodiment of the present disclosure can be electrically insulated from an upper electrode layer of the vibration generating part 10 and can be commonly connected to the second electrode layer 15 of the first vibration part 10-1 and the first electrode layer 13 of the second vibration part 10-2. For example, the second connection member 70 can not be electrically connected to or contact the first electrode layer 13 of the first vibration part 10-1 and can be electrically connected to the second electrode layer 15 of the first vibration part 10-1 and the first electrode layer 13 of the second vibration part 10-2 or can be connected thereto in common. For example, the second connection member 70 can be a second connection line, a second electrode connection line, a second internal connection line, a second signal transfer line, a second signal transfer member, a second electrode connection member, a second electrode connection means, a second bridge line, a second electrode bridge line, or a second electrode extension line.

The second connection member 70 according to an embodiment of the present disclosure can include a conductive double-sided adhesive member. For example, the second connection member 70 can be a conductive double-sided tape, a conductive double-sided adhesive pad, or a conductive double-sided cushion tape, but embodiments of the present disclosure are not limited thereto.

The second connection member 70 according to an embodiment of the present disclosure can include a metal layer 71 and tacky layers (or adhesive layers) 72 and 73. The tacky layers (or adhesive layers) 72 and 73 can include a conductive tacky material, and thus, the tacky layers (or adhesive layers) 72 and 73 can be conductive tacky layers (or conductive adhesive layers) 72 and 73. The tacky layers (or adhesive layers) 72 and 73 can be configured to surround the metal layer 71. For example, the metal layer 71 can be embedded (or built-in) or inserted (or accommodated) into one of the tacky layers (or adhesive layers) 72 and 73. The metal layer 71 and the tacky layers (or adhesive layers) 72 and 73 of the second connection member 70 can be substantially the same as the metal layer 71 and the tacky layers (or adhesive layers) 72 and 73 of the connection member 70 described above with reference to FIGS. 1 to 6, and thus, the repetitive descriptions thereof can be omitted or may be briefly provided.

The second connection member 70 according to another embodiment of the present disclosure can include a metal layer 71, a first tacky layer (or a first conductive tacky layer or a first adhesive layer) 72 coupled to a first surface of the metal layer 71, and a second tacky layer (or a second conductive tacky layer or a second adhesive layer) 73 coupled to a second surface of the metal layer 71.

The second connection member 70 according to an embodiment of the present disclosure can include a first connection portion (or a fourth connection portion) 70*a*, a second connection portion (or a fifth connection portion) 70*b*, and a third connection portion (or a sixth connection portion) 70*c*. For example, the second connection member 70 can be divided into the first to third connection portions 70*a* to 70*c*, based on a position at which the vibration generating part 10 is disposed. Except for that the second connection member 70 is connected to the second electrode layer 15 of the first vibration part 10-1 and the first electrode layer 13 of the second vibration part 10-2 in common, the connection member 70 can be substantially the same as the connection member 70 described above with reference to FIGS. 1 to 6, and thus, the repetitive descriptions thereof can be omitted or will be briefly given below.

As illustrated in FIGS. 8, 9, and 11, the first connection portion 70*a* of the second connection member 70 can be electrically connected to an inner electrode layer of the vibration generating part 10. The first connection portion 70*a* can be configured to be disposed or interposed between the first vibration part 10-1 and the second vibration part 10-2. For example, the first connection portion 70*a* of the second connection member 70 can be electrically connected to the second electrode layer 15 of the first vibration part 10-1 and the first electrode layer 13 of the second vibration part 10-2, or can be connected thereto in common. For example, the first connection portion 70*a* can be electrically connected to at least a portion of each of the second electrode layer 15 of the first vibration part 10-1 and the first electrode layer 13 of the second vibration part 10-2. For example, the first connection portion 70*a* can be configured to be electrically connected to the other portion, except a periphery portion, of each of the second electrode layer 15 of the first vibration part 10-1 and the first electrode layer 13 of the second vibration part 10-2. For example, the first connection portion 70*a* can be a fourth connection portion, a third contact portion, an internal electrode connection portion, or an intermediate electrode connection portion.

According to an embodiment of the present disclosure, the second electrode layer 15 of the first vibration part 10-1 can be electrically connected to the metal layer 71 through one tacky layer (or one adhesive layer) 72 or a first tacky layer (or a first adhesive layer) 72 of the first connection portion 70*a*. In addition, the first electrode layer 13 of the second vibration part 10-2 can be electrically connected to the metal layer 71 through the one tacky layer (or one adhesive layer) 73 or a second tacky layer (or a second adhesive layer) 73 of the first connection portion 70*a*.

As illustrated in FIGS. 8, 9, and 11, the second connection portion 70*b* of the second connection member 70 can be disposed on the first surface 10*a* of the vibration generating part 10. The second connection portion 70*b* can be bent from the third connection portion 70*c* toward a portion on the first surface 10*a* of the vibration generating part 10. For example, the second connection portion 70*b* can be disposed to be electrically insulated (or disconnected) from the first surface of the first vibration part 10-1 (or the first electrode layer 13 of the first vibration part 10-1). The second connection portion 70*b* can be spaced apart from the first surface 10*a* of the vibration generating part 10 (or the first electrode layer 13 of the first vibration part 10-1). For example, the second connection portion 70*b* can be disposed spaced apart from the first electrode layer 13 of the first vibration part 10-1 so as not to electrically be connected (or short-circuited) to the first electrode layer 13 of the first vibration part 10-1. For example, the second connection portion 70*b* can configure a second signal line connection portion which is disposed on the first surface 10*a* of the vibration generating part 10. For example, the second connection portion 70*b* can be a fifth connection part, a fourth contact portion, a second front contact portion, a second front connection portion, a second extension portion, a second end portion, one side portion, a second signal line connection portion, or a second signal line contact portion. For example, descriptions of the second connection portion 70*b* illustrated in FIGS. 1 to 6 can be included in descriptions of the second connection portion 70*b* illustrated in FIGS. 7 to 12.

As illustrated in FIGS. 8, 9, and 11, the third connection portion 70*c* of the second connection member 70 can be connected or disposed between the first connection portion 70*a* and the second connection portion 70*b*. The third connection portion 70*c* can protrude or extend to have a certain length and width from one lateral surface (or one sidewall) of the first connection portion 70*a*, and can be connected to the second connection portion 70*b*. For example, the second connection portion 70*b* can be a periphery portion or an end portion (or one side) of the third connection portion 70*c*. The third connection portion 70*c* can be disposed at one lateral surface (or an outer surface) of the vibration generating part 10, or can be disposed at one lateral surface (or an outer surface) of the first vibration part 10-1. The third connection portion 70*c* can protrude or extend from the one lateral surface (or the one sidewall) of the first connection portion 70*a* to cover a portion of the one lateral surface (or the outer surface) of the first vibration part 10-1. The third connection portion 70*c* can be attached at the one lateral surface (or the outer surface) of the first vibration part 10-1. For example, the third connection portion 70*c* can be a sixth connection part, a second side portion, a second side connection portion, or a second side connection line.

The vibration apparatus 3 or the second connection member 70 according to the third embodiment of the present disclosure can further include an insulation member 80.

The insulation member 80 can be configured to electrically insulate (or disconnect) the second connection member 70 from the first surface 10*a* or the upper electrode layer of the vibration generating part 10. The insulation member 80 can be configured to prevent an electrical connection (or short circuit) between the first surface or the first electrode layer 13 of the first vibration part 10-1 and the second connection member 70. The insulation member 80 can be configured to prevent an electrical connection (or short circuit) between the first electrode layer 13 of the first vibration part 10-1 and the second connection portion 70*b* of the second connection member 70. For example, the insulation member 80 can be an insulation pad, a single-sided insulation tape, a double-sided insulation tape, a pad, a middle member, or a middle insulation pad. Except for that the insulation member 80 is disposed between the first surface (or the first electrode layer 13) of the first vibration part 10-1 and the second connection portion 70*b* of the second connection member 70, the insulation layer 80 can be substantially the same as the insulation member 80 described above with reference to FIGS. 1 to 6, and thus, the repetitive descriptions thereof can be omitted or may be briefly provided. For example, descriptions of the insulation member 80 illustrated in FIGS. 1 to 5 can be included in descriptions of the insulation member 80 illustrated in FIGS. 7 to 12.

The insulation member 80 according to another embodiment of the present disclosure can be integrated (or configured) as one body with the second connection member 70. The second connection portion 70*b* can include the insulation member 80. For example, the insulation member 80 can be coupled to or integrated into the second connection portion 70*b* of the second connection member 70. Accordingly, the insulation member 80 can be disposed or attached at the first surface 10*a* of the vibration generating part 10 (or the first electrode layer 13 of the first vibration part 10-1) with being coupled to the second connection portion 70*b* of the connection member 70.

The signal supply member 90 can be electrically connected to the vibration generating part 10 (or the first and second vibration parts 10-1 and 10-2), between the first surface 10*a* of the vibration generating part 10 and the first cover member 30. For example, the signal supply member 90 can be disposed between the first surface 10*a* of the vibration generating part 10 and the first cover member 30 and can be configured to be electrically connected to the first and second signal line connection portions electrically connected to the first and second vibration parts 10-1 and 10-2 at the first surface 10*a* of the vibration generating part 10. For example, the signal supply member 90 can be electrically connected to each of the first electrode layer 13 and the second electrode layer 15 of the first vibration part 10-1, between the first surface 10*a* of the vibration generating part 10 and the first cover member 30, and can be additionally connected to each of the first electrode layer 13 and the second electrode layer 15 of the second vibration part 10-2. For example, the signal supply member 90 can be disposed between the first surface 10*a* of the vibration generating part 10 and the first cover member 30 and can be electrically connected to the first and second connection members 60 and 70.

The signal supply member 90 according to an embodiment of the present disclosure can include a base member 91, a first signal line 93, and a second signal line 95. The signal supply member 90 according to an embodiment of the present disclosure can further include an insulation member 97.

The signal supply member 90 can be configured to include a first signal line 93, which is electrically connected to the first signal line connection portion of the vibration generating part 10, and a second signal line 95 which is electrically connected to the second signal line connection portion of the vibration generating part 10. The signal supply member 90 can include a first signal line 93, which is electrically connected to the first connection member 60, and a second signal line 95 which is electrically connected to the second connection member 70. For example, the signal supply member 90 can include a first signal line 93, which is electrically connected to a second connection portion 60*b* of the first connection member 60, and a second signal line 95 which is electrically connected to a second connection portion 70*b* of the second connection member 70. Except for that the first signal line 93 is connected to the first connection member 60 and the second signal line 95 is connected to the second connection member 70, the signal supply member 90 can be substantially the same as the signal supply member 90 described above with reference to FIGS. 1 to 6, and thus, the repetitive descriptions thereof can be omitted or can be briefly given below. For example, descriptions of the signal supply member 90 illustrated in FIGS. 1 to 5 can be included in descriptions of the signal supply member 90 illustrated in FIGS. 7 to 12.

An end portion (or a distal end portion) 93*a* of the first signal line 93 can be electrically connected to the first connection member 60 (or the second connection portion 60*b* of the first connection member 60), between the first surface 10*a* of the vibration generating part 10 and the first cover member 30. For example, the end portion 93*a* of the first signal line 93 can be directly connected to or directly contact the first connection member 60, but embodiments of the present disclosure are not limited thereto. For example, the end portion 93*a* of the first signal line 93 can be electrically connected to the first connection member 60 through a conductive double-sided tape. Accordingly, a driving signal (or a first driving signal) supplied from a vibration driving circuit can be simultaneously supplied to an upper electrode layer and a lower electrode layer of the vibration generating part 10 through the first signal line 93 and the first connection member 60. For example, the first driving signal can be simultaneously supplied to the first electrode layer 13 of the first vibration part 10-1 and the second electrode layer 15 of the second vibration part 10-2 through the first signal line 93 and the first connection member 60.

An end portion (or a distal end portion) 95*a* of the second signal line 95 can be electrically connected to the second connection member 70 (or the second connection portion 70*b* of the second connection member 70), between the first surface 10*a* of the vibration generating part 10 and the first cover member 30. For example, the end portion 95*a* of the second signal line 95 can be directly connected to or directly contact the second connection member 70, but embodiments of the present disclosure are not limited thereto. For example, the end portion 95*a* of the second signal line 95 can be electrically connected to the second connection member 70 through a conductive double-sided tape. Accordingly, a driving signal (or a second driving signal) supplied from the vibration driving circuit can be simultaneously supplied to an inner electrode layer of the vibration generating part 10 through the second signal line 95 and the second connection member 70. For example, the second driving signal can be simultaneously supplied to the second electrode layer 15 of the first vibration part 10-1 and the first electrode layer 13 of the second vibration part 10-2 through the second signal line 95 and the second connection member 70.

According to an embodiment of the present disclosure, a portion of the signal supply member 90 can be disposed or inserted (or accommodated) between the first surface 10*a* of the vibration generating part 10 and the first cover member 30, and thus, the signal supply member 90 can be integrated (or configured) as one body with the vibration generating part 10, whereby the signal supply member 90 and the vibration generating part 10 can be configured as one part (or an element or a one component). For example, the vibration apparatus 3 according to the third embodiment of the present disclosure can be a vibration apparatus which is integrated with the signal supply member 90.

The vibration apparatus 3 according to the third embodiment of the present disclosure can be implemented as a vibration apparatus having the same effect as that of the vibration apparatus 1 according to the first embodiment of the present disclosure. In addition, the vibration apparatus 3 according to the third embodiment of the present disclosure can include the plurality of vibration parts 10-1 and 10-2 which are stacked or overlap with each other to vibrate (or displace) in the same direction, and thus, vibration efficiency or a vibration characteristic can be enhanced and a vibration width (or a displacement width) can be maximized, thereby enhancing a sound characteristic and/or a sound pressure level of a pitched sound band including a low pitched sound band.

Figure 13:
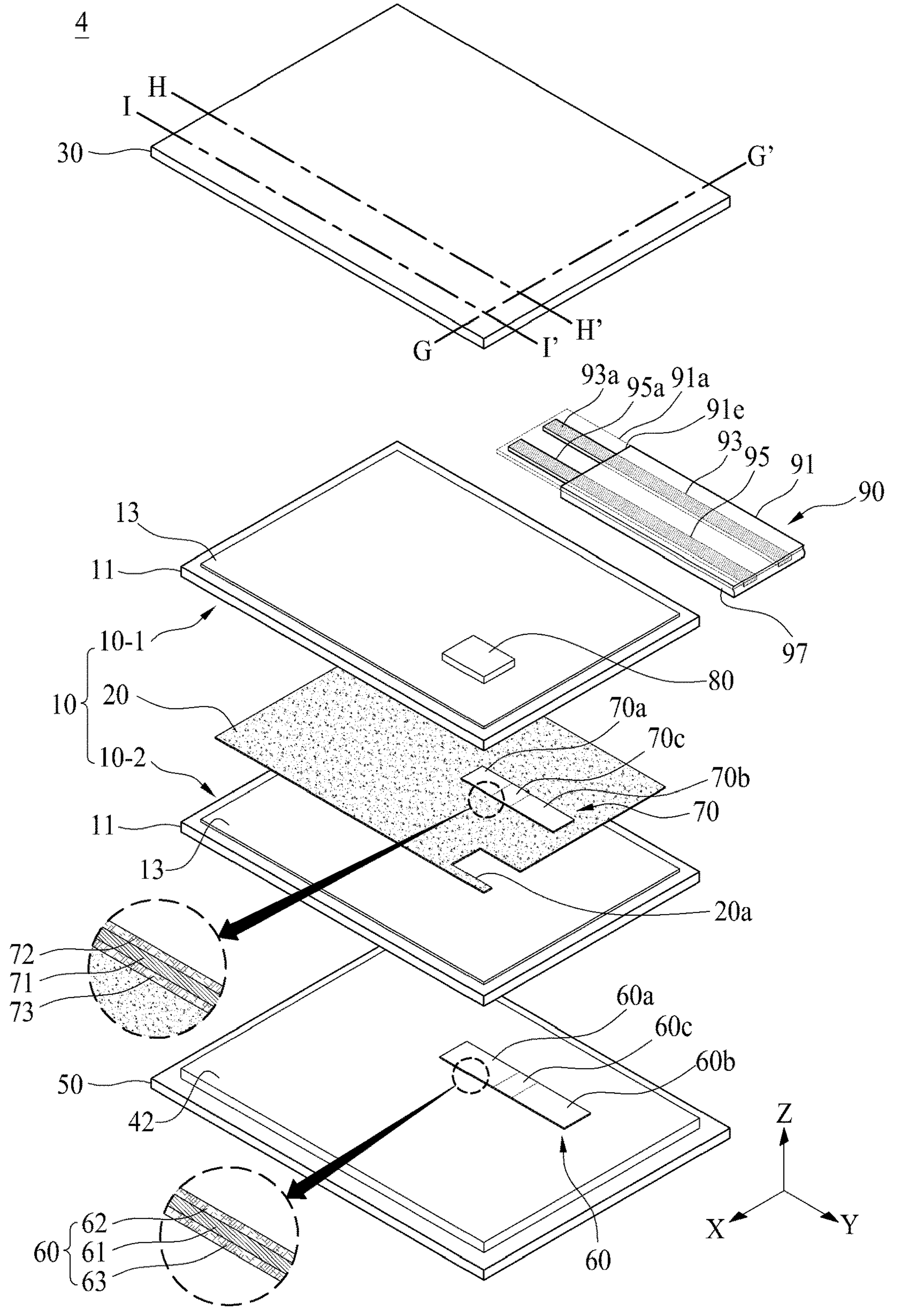
FIG. 13 is an exploded perspective view of a vibration apparatus according to a fourth embodiment of the present disclosure
Figure 14:
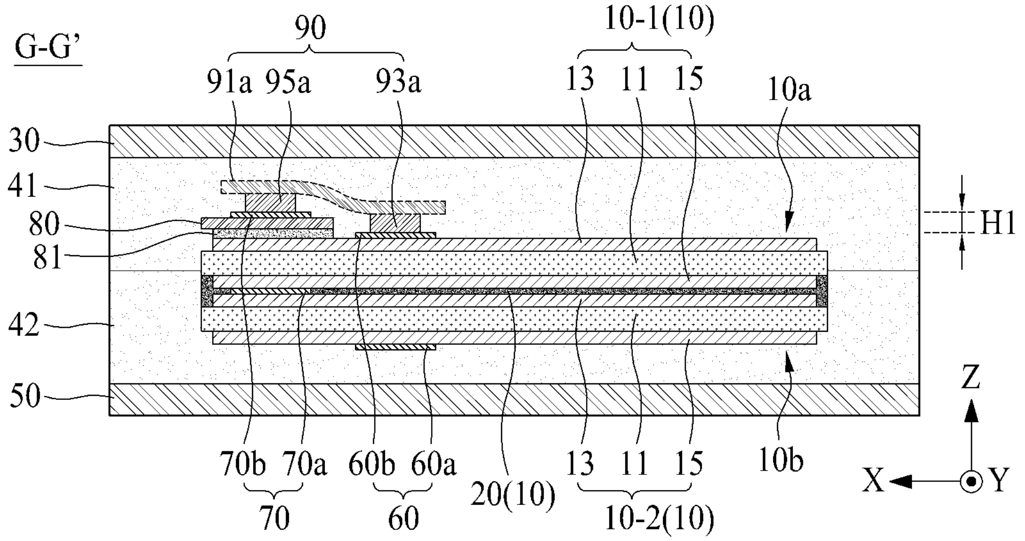
FIG. 14 is a cross-sectional view taken along line G-G' of FIG. 13 according to the fourth embodiment of the present disclosure.
Figure 15:
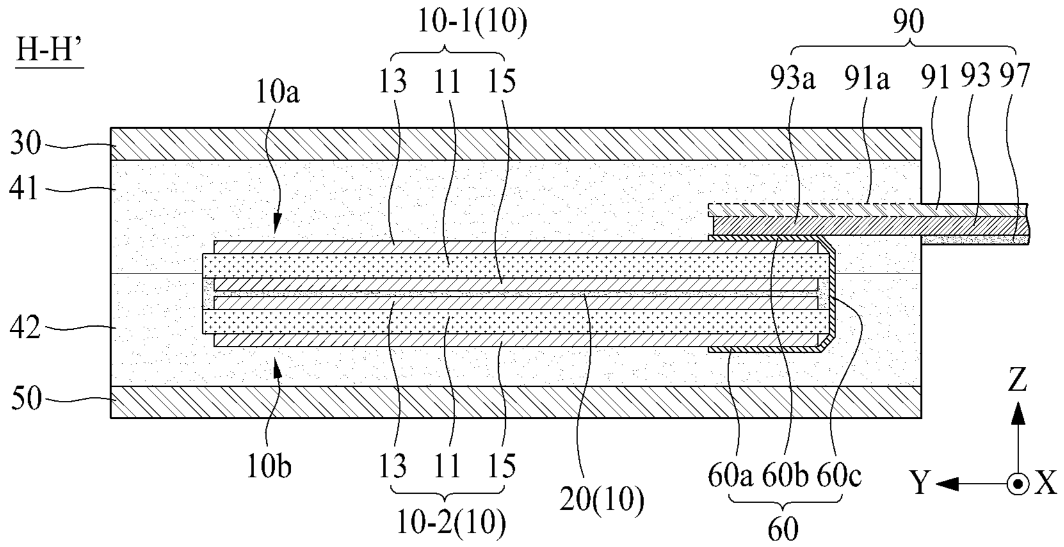
FIG. 15 is a cross-sectional view taken along line H-H' of FIG. 13 according to the fourth embodiment of the present disclosure.
Figure 16:
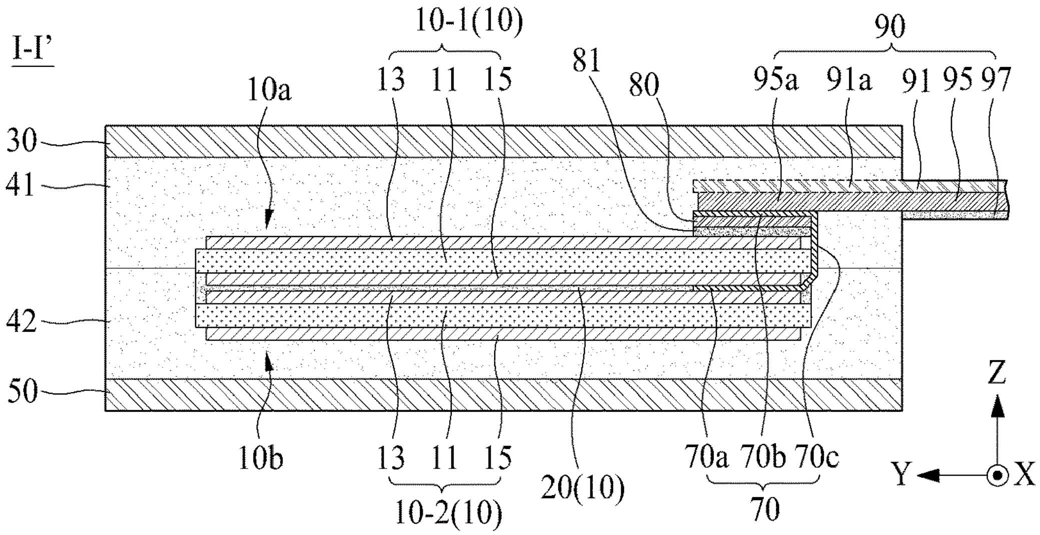
FIG. 16 is a cross-sectional view taken along line I-I' of FIG. 13 according to the fourth embodiment of the present disclosure.

FIG. 13 is an exploded perspective view of the vibration apparatus according to a fourth embodiment of the present disclosure. FIG. 14 is a cross-sectional view taken along line G-G' illustrated in FIG. 13 according to the fourth embodiment of the present disclosure. FIG. 15 is a cross-sectional view taken along line H-H' illustrated in FIG. 13 according to the fourth embodiment of the present disclosure. FIG. 16 is a cross-sectional view taken along line I-I' illustrated in FIG. 13 according to the fourth embodiment of the present disclosure. FIGS. 13 to 16 illustrate an embodiment implemented by modifying the vibration generating part 10 or the second connection member 70 in the vibration apparatus 3 according to the third embodiment of the present disclosure described above with reference to FIGS. 7 to 12. Hereinafter, in describing the vibration apparatus according to a fourth embodiment of the present disclosure, elements differing from the elements of the vibration apparatus 3 according to the third embodiment of the present disclosure will be mainly described.

With reference to FIGS. 13 to 16, a vibration apparatus 4 according to a fourth embodiment of the present disclosure can include a vibration generating part 10, a first cover member 30, a second cover member 50, a first connection member 60, a second connection member 70, and a signal supply member 90.

The vibration generating part 10 can include a plurality of vibration parts 10-1 and 10-2 which are stacked or overlap with an intermediate member 20 therebetween. For example, the vibration generating part 10 can include a plurality of vibration part 10-1 and 10-2 which are stacked or piled up each other. For example, the vibration generating part 10 can include the plurality of vibration parts 10-1 and 10-2, which are stacked or overlap with each other, and the intermediate member 20 between the plurality of vibration parts 10-1 and 10-2.

The vibration apparatus 4 according to the fourth embodiment of the present disclosure can include a first vibration part 10-1, a second vibration part 10-2, and the intermediate member 20.

The first vibration part 10-1 can be stacked or disposed on the second vibration part 10-2. For example, a first surface 10*a* of the vibration generating part 10 can be a first surface (or an upper surface) of the first vibration part 10-1, and a second surface 10*b* of the vibration generating part 10 can be a second surface (or a lower surface) of the second vibrating part 10-2. The first vibration part 10-1 and the second vibration part 10-2 can be substantially the same as the first vibration part 10-1 and the second vibration part 10-2 described above with reference to FIGS. 7 to 12, and thus, like reference numerals refer to like elements and the repetitive descriptions thereof can be omitted or can be briefly given.

The intermediate member 20 can be disposed or interposed between the first vibration part 10-1 and the second vibration part 10-2. For example, the intermediate member 20 can be disposed or interposed between the second electrode layer 15 of the first vibration part 10-1 and the first electrode layer 13 of the second vibration part 10-2. Accordingly, each of the first vibration part 10-1 and the second vibration part 10-2 can be connected to or attached at the intermediate member 20. For example, the intermediate member 20 can be an inner insulation member, a middle insulation member, a second insulation member, a middle adhesive member, a middle connection member, or a middle coupling member.

The intermediate member 20 can be disposed or interposed at the other portion, except a partial region, between the first vibration part 10-1 and the second vibration part 10-2. For example, the intermediate member 20 can be disposed or interposed at the other portion, except a partial region, of each of a second electrode layer 15 of the first vibration part 10-1 and a first electrode layer 13 of the second vibration part 10-2. Accordingly, the other portion, except the partial region, of each of the second electrode layer 15 of the first vibration part 10-1 and the first electrode layer 13 of the second vibration part 10-2 can be connected to or attached at the intermediate member 20.

The intermediate member 20 can be disposed between a vibration layer 11 of the first vibration part 10-1 and a vibration layer 11 of the second vibration part 10-2 and can be provided to surround the other portion, except the partial region, of each of the second electrode layer 15 of the first vibration part 10-1 and the first electrode layer 13 of the second vibration part 10-2. For example, the intermediate member 20 can be disposed between the second electrode layer 15 of the first vibration part 10-1 and the first electrode layer 13 of the second vibration part 10-2 and can be configured to surround a lateral surface of each of the second electrode layer 15 of the first vibration part 10-1 and the first electrode layer 13 of the second vibration part 10-2.

The intermediate member 20 according to an embodiment of the present disclosure can include a double-sided adhesive member. For example, the intermediate member 20 can include a double-sided tape, a single-sided foam pad, or a double-sided foam tape, or the like, but embodiments of the present disclosure are not limited thereto. For example, an adhesive layer of the intermediate member 20 can include epoxy-based material, acrylic-based material, silicone-based material, or urethane-based material, but embodiments of the present disclosure are not limited thereto. The adhesive layer of the intermediate member 20 can include a urethane-based material (or substance) which relatively has a ductile characteristic compared to acrylic-based material. Accordingly, in the vibration generating part 10 according to an embodiment of the present disclosure, the vibration loss of the vibration generating part 10 caused by displacement interference between the first and second vibration parts 10-1 and 10-2 can be minimized, or each of the first and second vibration parts 10-1 and 10-2 can be freely displaced.

The intermediate member 20 according to another example embodiment of the present disclosure can include an insulating adhesive material. For example, the intermediate member 20 can include one or more of a thermo-curable adhesive, a photo-curable adhesive, and a thermal bonding adhesive (or a hot-melt adhesive). For example, the intermediate member 20 can include the thermo-curable adhesive or the thermal bonding adhesive. The thermal bonding adhesive can be a heat-active type or a thermo-curable type. For example, the intermediate member 20 including the thermal bonding adhesive can attach or couple two adjacent vibration parts 10-1 and 10-2 by heat and pressure. For example, the intermediate member 20 including the thermal bonding adhesive can minimize or reduce the loss of vibration of the vibration generating part 10.

According to another embodiment of the present disclosure, an insulating adhesive material of the intermediate member 20 disposed between the first vibration part 10-1 and the second vibration part 10-2 can be enlarged to cover the lateral surface of each of the second electrode layer 15 of the first vibration part 10-1 and the first electrode layer 13 of the second vibration part 10-2 by a laminating process by pressure. Accordingly, the insulating adhesive material of the intermediate member 20 can be disposed (or filled) between the vibration layer 11 of the first vibration part 10-1 and the vibration layer 11 of the second vibration part 10-2, and thus, can surround the other portion, except a partial region, of each of the second electrode layer 15 of the first vibration part 10-1 and the first electrode layer 13 of the second vibration part 10-2.

According to another embodiment of the present disclosure, the first vibration part 10-1 and the second vibration part 10-2 can be integrated as one structure (or an element or a one component) by a laminating process using the intermediate member 20. For example, the first vibration part 10-1 and the second vibration part 10-2 can be integrated as one vibration generating part 10 or one structure by the laminating process by heat and pressure.

The intermediate member 20 according to another embodiment of the present disclosure can include an opening portion 20*a*. For example, the opening portion 20*a* can be a portion where one lateral portion of the intermediate member 20 is removed by a certain size. For example, the opening portion 20*a* can be a portion, where the intermediate member 20 is not disposed, between the second electrode layer 15 of the first vibration part 10-1 and the first electrode layer 13 of the second vibration part 10-2. For example, the opening portion 20*a* can be an electrode exposure portion, an inner electrode exposure portion, a slit portion, a groove portion, or a non-disposition region of the intermediate member 20.

The opening portion 20*a* can be configured to expose a partial region of each of the second electrode layer 15 of the first vibration part 10-1 and the first electrode layer 13 of the second vibration part 10-2. The partial regions of the second electrode layer 15 of the first vibration part 10-1 and the first electrode layer 13 of the second vibration part 10-2 can directly face each other through the opening portion 20*a*. For example, the partial region of each of the second electrode layer 15 of the first vibration part 10-1 and the first electrode layer 13 of the second vibration part 10-2 can be an electrode contact region, a middle electrode contact region, or an inner electrode contact region.

Each of the first cover member 30, the second cover member 50, and the first connection member 60 can be substantially the same as each of the first cover member 30, the second cover member 50, and the first connection member 60 described above with reference to FIGS. 7 to 12, and thus, like reference numeral refer to like element and the repetitive description thereof can be omitted or may be briefly discussed.

The second connection member 70 can be disposed between a first surface 10*a* of the vibration generating part 10 and the first cover member 30 and can configure a second signal line connection portion of the vibration generating part 10. The second connection member 70 can be between the first surface 10*a* of the vibration generating part 10 and the first cover member 30 and can be electrically connected to an inner electrode layer of the vibration generating part 10 through the opening portion 20*a* of the intermediate member 20. For example, the second connection member 70 can be connected to the partial region of each of the second electrode layer 15 of the first vibration part 10-1 and the first electrode layer 13 of the second vibration part 10-2 in common through the opening part 20*a* of the intermediate member 20 and can configure the second signal line connection portion of the vibration generating part 10, between the first surface 10*a* of the vibration generating part 10 and the first cover member 30.

The second connection member 70 according to an embodiment of the present disclosure can be electrically insulated from an upper electrode layer of the vibration generating part 10 and can be commonly connected to the second electrode layer 15 of the first vibration part 10-1 and the first electrode layer 13 of the second vibration part 10-2. For example, the second connection member 70 cannot be electrically connected to or contact the first electrode layer 13 of the first vibration part 10-1 and can be electrically connected to the second electrode layer 15 of the first vibration part 10-1 and the first electrode layer 13 of the second vibration part 10-2 or can be connected thereto in common. For example, the second connection member 70 can have a thickness which is greater than or equal to that of the intermediate member 20. For example, the intermediate member 20 can have a thickness which enables the second connection member 70 to be electrically connected to each of the second electrode layer 15 of the first vibration part 10-1 and the first electrode layer 13 of the second vibration part 10-2.

The second connection member 70 according to an embodiment of the present disclosure can include a metal layer 71, a first tacky layer (or a first conductive tacky layer or a first adhesive layer) 72 coupled to a first surface of the metal layer 71, and a second tacky layer (or a second conductive tacky layer or a second adhesive layer) 73 coupled or connected to a second surface of the metal layer 71. The metal layer 71 and the tacky layers (or adhesive layers) 72 and 73 of the second connection member 70 can be substantially the same as the metal layer 71 and the tacky layers (or adhesive layers) 72 and 73 of the connection member 70 described above with reference to FIGS. 1 to 6, and thus, the repetitive descriptions thereof can be omitted or may be briefly provided.

The second connection member 70 according to an embodiment of the present disclosure can include a first connection portion (or a fourth connection portion) 70*a*, a second connection portion (or a fifth connection portion) 70*b*, and a third connection portion (or a sixth connection portion) 70*c*. For example, the second connection member 70 can have a line shape including first to third connection portions 70*a*, 70*b*, and 70*c*.

As illustrated in FIGS. 13 and 16, the first connection portion 70*a* of the second connection member 70 can be inserted (or accommodated) into or disposed at the opening portion 20*a* of the intermediate member 20 and can be electrically connected to the inner electrode layer of the vibration generating part 10. The first connection portion 70*a* can be disposed at the opening portion 20*a* of the intermediate member 20 and can be disposed or interposed between the first vibration part 10-1 and the second vibration part 10-2. The first connection portion 70*a* of the second connection member 70 can be electrically or commonly connected to each of the second electrode layer 15 of the first vibration part 10-1 and the first electrode layer 13 of the second vibration part 10-2 in the opening portion 20*a* of the intermediate member 20. Except for that the first connection part 70*a* is configured to be electrically connected to each of the second electrode layer 15 of the first vibration part 10-1 and the first electrode layer 13 of the second vibration part 10-2 in the opening portion 20*a* of the intermediate member 20, the first connection portion 70*a* can be substantially the same as the first connection portion 70*a* described above with reference to FIGS. 1 to 5, and thus, the repetitive descriptions thereof can be omitted or may be briefly provided. For example, descriptions of the first connection portion 70*a* illustrated in FIGS. 1 to 5 can be included in descriptions of the first connection portion 70*a* illustrated in FIGS. 13 to 16.

As illustrated in FIGS. 13, 14, and 16, the second connection portion 70*b* of the second connection member 70 can be disposed on the first surface 10*a* of the vibration generating part 10. For example, the second connection portion 70*b* can be disposed to be electrically insulated (or disconnected) from the first surface of the first vibration part 10-1 (or the first electrode layer 13 of the first vibration part 10-1). For example, the second connection portion 70*b* can be disposed at an insulation member 80 which is disposed at a first surface 10*a* of the vibration generating part 10. For example, the second connection portion 70*b* can be bent from the third connection portion 70*c* toward a portion on the insulation member 80. For example, the second connection part 70*b* can be disposed to be electrically insulated (or disconnected) from a first surface of the first vibration part 10-1 (or the first electrode layer 13 of the first vibration part 10-1) by the insulation member 80. The second connection portion 70*b* can be substantially the same as the second connection portion 70*b* described above with reference to FIGS. 1 to 6, and thus, the repetitive descriptions thereof can be omitted or may be briefly provided. For example, descriptions of the second connection portion 70*b* illustrated in FIGS. 1 to 6 can be included in descriptions of the second connection portion 70*b* illustrated in FIGS. 13 to 16.

As illustrated in FIGS. 13 and 16, the third connection portion 70*c* of the second connection member 70 can be connected or disposed between the first connection portion 70*a* and the second connection portion 70*b*. The third connection portion 70*c* can extend from the first connection portion 70*a* and can be connected to the second connection portion 70*b*. For example, the second connection portion 70*b* can be a periphery portion or an end portion (or one side) of the third connection portion 70*c*. The third connection portion 70*c* can be attached at one lateral surface (or an outer surface) of the first vibration part 10-1. The third connection portion 70*c* can be substantially the same as the third connection portion 70*c* described above with reference to FIGS. 1 to 6, and thus, the repetitive descriptions thereof can be omitted or may be briefly provided. For example, descriptions of the third connection portion 70*c* illustrated in FIGS. 1 to 6 can be included in descriptions of the third connection portion 70*c* illustrated in FIGS. 13 to 16.

The signal supply member 90 can be disposed between the first surface 10*a* of the vibration generating part 10 and the first cover member 30 and can be electrically connected to first and second signal line connection parts which are at the first surface 10*a* of the vibration generating part 10. For example, the signal supply member 90 can be disposed between the first surface 10*a* of the vibration generating part 10 and the first cover member 30 and can be configured to be electrically connected to the first and second connection members 60 and 70. For example, the signal supply member 90 can include a first signal line 93, which is electrically connected to a first signal line connection portion of the vibration generating part 10, and a second signal line 95 which is electrically connected to the second signal line connection portion of the vibration generating part 10. The signal supply member 90 can be substantially the same as the signal supply member 90 described above with reference to FIGS. 7 to 12, and thus, the repetitive descriptions thereof can be omitted or may be briefly provided. For example, descriptions of the signal supply member 90 illustrated in FIGS. 7 to 12 can be included in descriptions of the signal supply member 90 illustrated in FIGS. 13 to 16.

The vibration apparatus 4 according to the fourth embodiment of the present disclosure can be implemented as a vibration apparatus having the same effect as that of the vibration apparatus 3 according to the third embodiment of the present disclosure. Further, comparing with the vibration apparatus 3 according to the third embodiment of the present disclosure, in the vibration apparatus 4 according to the fourth embodiment of the present disclosure, a size of the second connection member 70 which is relatively expensive can be reduced by the metal layer 71, and thus, the manufacturing cost can decrease.

Figure 17:
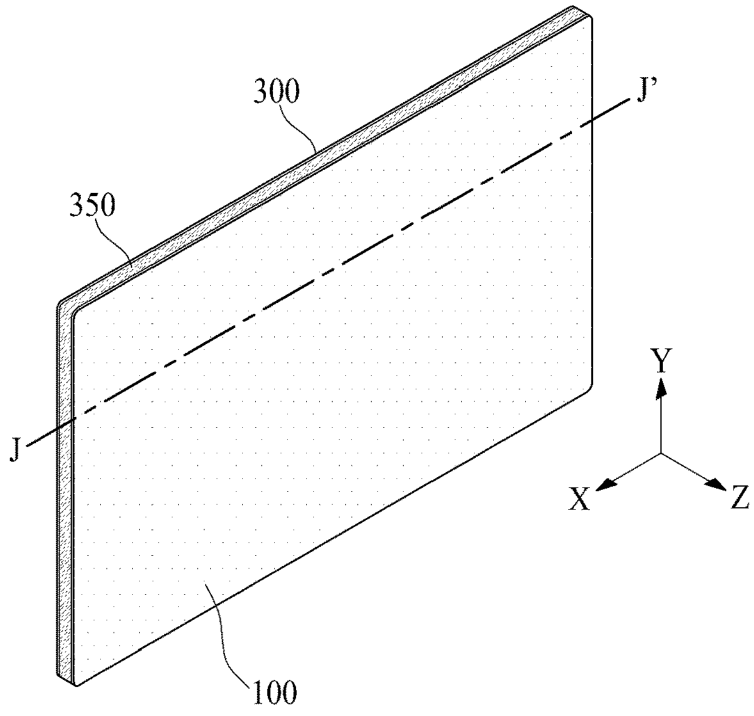
FIG. 17 illustrates an apparatus according to an embodiment of the present disclosure.
Figure 18:
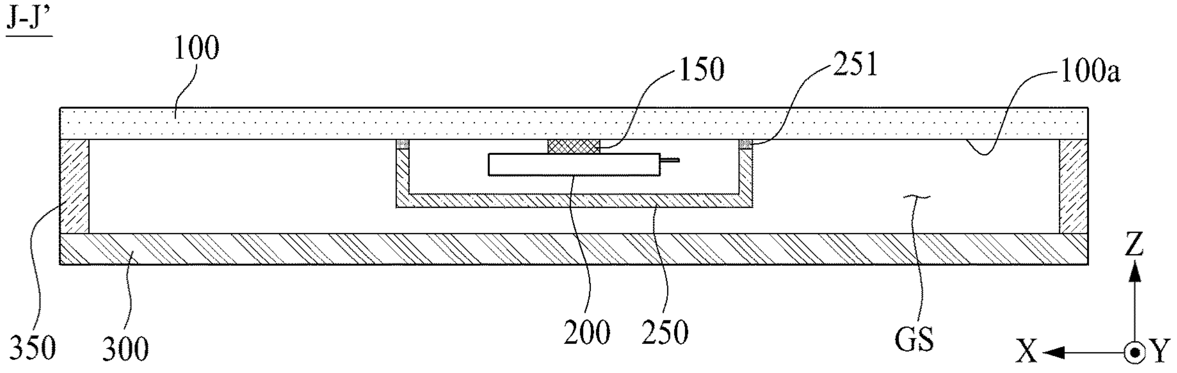
FIG. 18 is a cross-sectional view taken along line J-J' of FIG. 17 according to an embodiment of the present disclosure.

FIG. 17 illustrates an apparatus according to an embodiment of the present disclosure. FIG. 18 is a cross-sectional view taken along line J-J' illustrated in FIG. 17 according to the embodiment of the present disclosure.

With reference to FIGS. 17 and 18, the apparatus according to an embodiment of the present disclosure can include a passive vibration member 100 and one or more vibration generating apparatuses 200.

The apparatus according to each embodiment of the present disclosure can be applied to implement a display apparatus, a sound apparatus, a sound generating apparatus, a sound bar, an analog signage, or a digital signage, or the like, but embodiments of the present disclosure are not limited thereto.

The display apparatus can include a display panel which includes a plurality of pixels for implementing a black/white or color image, and a driver for driving the display panel. For example, the display panel can be a display panel, such as a liquid crystal display panel, an organic light emitting display panel, a light emitting diode display panel, an electrophoresis display panel, an electro-wetting display panel, a micro light emitting diode display panel, or a quantum dot light emitting display panel, or the like, but embodiments of the present disclosure are not limited thereto. For example, in the organic light emitting display panel, a pixel can include an organic light emitting device such as an organic light emitting layer or the like, and the pixel can be a subpixel which implements any one of a plurality of colors configuring a color image. Accordingly, the apparatus according to each embodiment of the present disclosure can include a set electronic apparatus or a set device (or a set apparatus) such as a notebook computer, a television, a computer monitor, an equipment apparatus including an automotive apparatus or another type apparatus for vehicles, or a mobile electronic apparatus such as a smartphone or an electronic pad, or the like, which is a complete product (or a final product) including the display panel such as the liquid crystal display panel or the organic light emitting display panel, or the like.

The analog signage can be an advertising signboard, a poster, a noticeboard, or the like. The analog signage can include signage content such as a sentence, a picture, and a sign, or the like. The signage content can be disposed at the passive vibration member 100 of the apparatus to be visible. The signage content can be directly attached at the passive vibration member 100 and the signage content can be printed or the like on a medium such as paper, and the medium can be attached at the passive vibration member 100.

The passive vibration member 100 can vibrate based on driving (or vibration or displacing) of the one or more vibration generating apparatuses 200. For example, the passive vibration member 100 can generate one or more of a vibration and a sound based on driving of the one or more vibration generating apparatuses 200.

The passive vibration member 100 according to an embodiment of the present disclosure can be a display panel including a display part (or a screen) including a plurality of pixels which implement a black/white or color image. Therefore, the passive vibration member 100 can generate one or more of a vibration and a sound based on driving of the one or more vibration generating apparatuses 200. For example, the passive vibration member 100 can vibrate based on driving of the vibration generating apparatus 200 while displaying an image on the display part, thereby generating or outputting a sound synchronized with the image in the display part. For example, the passive vibration member 100 can be a vibration object, a display member, a display panel, a signage panel, a passive vibration plate, a front cover, a front member, a vibration panel, a sound panel, a passive vibration panel, a sound output plate, a sound vibration plate, or an image screen, or the like, but embodiments of the present disclosure are not limited thereto.

The passive vibration member 100 according to another embodiment of the present disclosure can be a vibration plate which includes a metal material or a nonmetal material (or a composite nonmetal material) having a material characteristic suitable for being vibrated by the one or more vibration generating apparatuses 200 to output sound. For example, the passive vibration member 100 can include a vibration plate which includes one or more of metal, plastic, wood, paper, fiber, cloth, leather, glass, rubber, carbon, and a mirror. For example, the paper can be cone paper for speakers. For example, the cone paper can be pulp or foamed plastic, or the like, but embodiments of the present disclosure are not limited thereto.

The passive vibration member 100 according to another embodiment of the present disclosure can include a display panel including a pixel which displays an image, or can include a non-display panel. For example, the passive vibration member 100 can include one or more among a display panel including a pixel configured to display an image, a screen panel on which an image is to be projected from a display apparatus, a lighting panel, a signage panel, a vehicular interior material, a vehicular exterior material, a vehicular glass window, a vehicular seat interior material, a building ceiling material, a building interior material, a building glass window, an aircraft interior material, an aircraft glass window, and a mirror, but embodiments of the present disclosure are not limited thereto. For example, the non-display panel can be a light emitting diode lighting panel (or apparatus), an organic light emitting lighting panel (or apparatus), or an inorganic light emitting lighting panel (or apparatus), but embodiments of the present disclosure are not limited thereto.

The one or more vibration generating apparatuses 200 can be configured to vibrate the passive vibration member 100. The one or more vibration generating apparatuses 200 can be configured to be connected to a rear surface 100*a* of the passive vibration member 100 by a supporting member 150. Accordingly, the one or more vibration generating apparatuses 200 can vibrate the passive vibration member 100 to generate or output one or more of a vibration and a sound based on a vibration of the passive vibration member 100.

The one or more vibration generating apparatuses 200 can include one or more of the vibration apparatuses 1 to 4 described above with reference to FIGS. 1 to 16. Accordingly, descriptions of the vibration apparatuses 1 to 4 described above with reference to FIGS. 1 to 16 can be included in descriptions of the vibration generating apparatus 200 illustrated in FIGS. 17 and 18, and thus, like reference numerals refer to like elements and repetitive descriptions thereof are omitted or may be briefly provided.

The supporting member 150 can be disposed between the vibration generating apparatus 200 and the passive vibration member 100. The supporting member 150 can be disposed between at least a portion of the vibration generating apparatus 200 and the passive vibration member 100. The supporting member 150 according to an embodiment of the present disclosure can be connected between the passive vibration member 100 and a center portion, except a periphery portion, of the vibration generating apparatus 200.

According to an embodiment of the present disclosure, the supporting member 150 can be connected between the passive vibration member 100 and the center portion of the vibration generating apparatus 200 based on a partial attachment method (or a local bonding method). The center portion (or a central portion) of the vibration generating apparatus 200 can be a portion (or a part) that becomes a center of a vibration, and thus, a vibration of the vibration generating apparatus 200 can be effectively transferred to the passive vibration member 100 through the supporting member 150. A periphery portion of the vibration generating apparatus 200 can be spaced apart from each of the supporting member 150 and the passive vibration member 100 and lifted without being connected to the supporting member 150 and/or the passive vibration member 100, and thus, in a flexural vibration (or a bending vibration) of the vibration generating apparatus 200, a vibration of the periphery portion of the vibration generating apparatus 200 can be prevented (or reduced) by the supporting member 150 and/or the passive vibration member 100, whereby a vibration amplitude (or a displacement amplitude) of the vibration generating apparatus 200 can increase. Accordingly, a vibration amplitude (or a displacement amplitude) of the passive vibration member 100 based on a vibration of the vibration generating apparatus 200 can increase, and thus, a sound characteristic and/or a sound pressure level characteristic of a low-pitched sound band generated based on a vibration of the passive vibration member 100 can be more enhanced.

The supporting member 150 according to another embodiment of the present disclosure can be connected to or attached on a whole front surface of each of the one or more vibration generating apparatuses 200 and the rear surface 100*a* of the passive vibration member 100 based on a whole surface attachment method (or an entire surface bonding method).

The supporting member 150 according to an embodiment of the present disclosure can be configured as a material including an adhesive layer which is good in adhesive force or attaching force with respect to each of the one or more vibration generating apparatuses 200 and a rear surface of the display panel or a rear surface of the passive vibration member 100. For example, the supporting member 150 can include a foam pad, a double-sided tape, a double-sided foam tape, or an adhesive, or the like, but embodiments of the present disclosure are not limited thereto. For example, the adhesive layer of the supporting member 150 can include epoxy, acrylic, silicone, or urethane, but embodiments of the present disclosure are not limited thereto. For example, the adhesive layer of the supporting member 150 can include an acrylic-based material (or substance) having a characteristic which is relatively good in adhesive force and high in hardness compared to the urethane-based material. Accordingly, a vibration of the one or more vibration generating apparatuses 200 can be effectively transferred to the passive vibration member 100. For example, the supporting member 150 can be a supporting part, a transfer member, a vibration transfer member, a panel connection member, or a panel coupling member.

The apparatus according to an embodiment of the present disclosure can further include a rear member 300 and a coupling member 350.

The rear member 300 can be disposed at the rear surface 100*a* of the passive vibration member 100. The rear member 300 can be disposed at the rear surface 100*a* of the passive vibration member 100 to cover the one or more vibration generating apparatus 200. The rear member 300 can be disposed at the rear surface 100*a* of the passive vibration member 100 to cover all of the rear surface 100*a* of the passive vibration member 100 and the one or more vibration generating apparatus 200. For example, the rear member 300 can have the same size as the passive vibration member 100. For example, the rear member 300 can cover a whole rear surface of the passive vibration member 100 with a gap space GS and the one or more vibration generating apparatus 200 therebetween. The gap space GS can be provided by the coupling member 350 disposed between the passive vibration member 100 and the rear member 300 facing each other. The gap space GS can be referred to as an air gap, an accommodating space, a vibration space, or a sound sounding box, but embodiments of the present disclosure are not limited thereto.

The rear member 300 can include any one material of a glass material, a metal material, and a plastic material. The rear member 300 can include a stacked structure in which one or more materials of a glass material, a plastic material, and a metal material is stacked thereof.

Each of the passive vibration member 100 and the rear member 300 can have a square shape or a rectangular shape, but embodiments of the present disclosure are not limited thereto, and can have a polygonal shape, a non-polygonal shape, a circular shape, or an oval shape. For example, when the apparatus according to an embodiment of the present disclosure is applied to a sound apparatus or a sound bar, each of the passive vibration member 100 and the rear member 300 can have a rectangular shape where a length of a long side is twice or more times longer than a short side, but embodiments of the present disclosure are not limited thereto.

The coupling member 350 can be connected between a rear periphery portion of the passive vibration member 100 and a front periphery portion of the rear member 300, and thus, can provide the gap space GS between the passive vibration member 100 and the rear member 300 facing each other.

The coupling member 350 according to an embodiment of the present disclosure can include an elastic material which has adhesive properties and is capable of compression and decompression. For example, the coupling member 350 can include a double-sided tape, a single-sided tape, a double-sided foam tape, or a double-sided adhesive foam pad, but embodiments of the present disclosure are not limited thereto. For example, the coupling member 350 can include an elastic pad such as a rubber pad or a silicone pad, or the like, which has adhesive properties and is capable of compression and decompression. For example, the coupling member 350 can be formed by elastomer.

The rear member 300 according to another embodiment of the present disclosure can further include a sidewall portion which supports the rear periphery portion of the passive vibration member 100. The sidewall portion of the rear member 300 can protrude or be bent toward the rear periphery portion of the passive vibration member 100 from the front periphery portion of the rear member 300, and thus, the gap space GS can be provided between the passive vibration member 100 and the rear member 300. For example, the coupling member 350 can be connected between the sidewall portion of the rear member 300 and the rear periphery portion of the passive vibration member 100. Accordingly, the rear member 300 can cover the one or more vibration generating apparatuses 200 and can support the rear surface 100*a* of the passive vibration member 100. For example, the rear member 300 can cover the one or more vibration generating apparatuses 200 and can support the rear periphery portion of the passive vibration member 100.

According to another embodiment of the present disclosure, the passive vibration member 100 can further include a sidewall portion which is connected to the front periphery portion of the rear member 300. The sidewall portion of the passive vibration member 100 can protrude or be bent toward the front periphery portion of the rear member 300 from the rear periphery portion of the passive vibration member 100, and thus, the gap space GS can be provided between the passive vibration member 100 and the rear member 300. A stiffness of the passive vibration member 100 can be increased based on the sidewall portion. For example, the coupling member 350 can be connected between the sidewall portion of the passive vibration member 100 and the front periphery portion of the rear member 300. Accordingly, the rear member 300 can cover the one or more vibration generating apparatuses 200 and can support the rear surface 100*a* of the passive vibration member 100. For example, the rear member 300 can cover the one or more vibration generating apparatuses 200 and can support the rear periphery portion of the passive vibration member 100.

The apparatus according to an embodiment of the present disclosure can further include one or more enclosure 250.

The enclosure 250 can be connected or coupled to the rear periphery portion of the passive vibration member 100 to individually cover the one or more vibration generating apparatuses 200. For example, the enclosure 250 can be connected or coupled to the rear surface 100*a* of the passive vibration member 100 by a coupling member 251. The enclosure 250 can configure a closed space which covers or surrounds the one or more vibration generating apparatus 200, in the rear surface of the rear member 300. For example, the enclosure 250 can be a closed member, a closed cap, a closed box, or a sound box, but embodiments of the present disclosure are not limited thereto. The closed space can be an air gap, a vibration space, a sound space, or a sounding box, but embodiments of the present disclosure are not limited thereto.

The enclosure 250 can include one or more materials of a metal material and a nonmetal material (or a composite nonmetal material). For example, the enclosure 250 can include one or more materials of a metal material, plastic, and wood, but embodiments of the present disclosure are not limited thereto.

The enclosure 250 according to an embodiment of the present disclosure can maintain an impedance component based on air acting on the passive vibration member 100 when the passive vibration member 100 or the one or more vibration generating apparatuses 200 is vibrating. For example, air around the passive vibration member 100 can resist a vibration of the passive vibration member 100 and can act as an impedance component having different reactance components and different resistance based on a frequency. Therefore, the enclosure 250 can configure a closed space which surrounds the one or more vibration generating apparatuses 200, in the rear surface 100*a* of the passive vibration member 100, and thus, can maintain an impedance component (or an air impedance or an elastic impedance) acting on the passive vibration member 100 based on air, thereby enhancing a sound characteristic and/or a sound pressure level characteristic of the low-pitched sound band and enhancing the quality of a sound of a high-pitched sound band.

Figure 19:
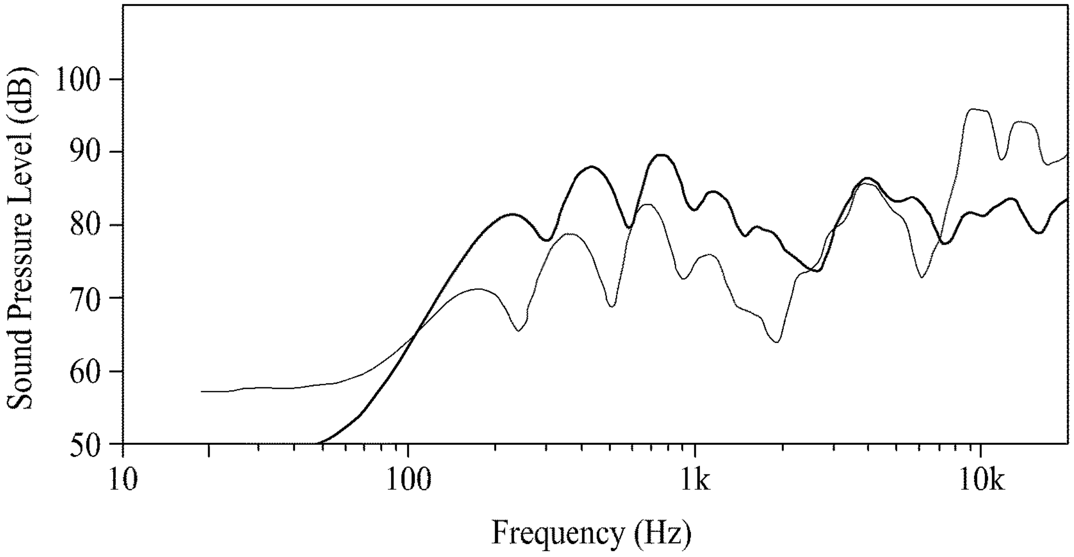
FIG. 19 illustrates an example of a sound output characteristic of a vibration apparatus according to some embodiments of the present disclosure.

FIG. 19 illustrates an example of a sound output characteristic of a vibration apparatus according to some embodiments of the present disclosure. In FIG. 19, the abscissa axis represents a frequency in hertz (Hz), and the ordinate axis represents a sound pressure level (SPL) in decibels (dB).

A sound output characteristic can be measured by a sound analysis apparatus. The sound analysis apparatus can be configured to include a sound card that can transmit or receive sound to or from a control personal computer (PC), an amplifier that can amplify a signal generated from the sound card and transfer the amplified signal to a vibration apparatus, and a microphone that can collect sound generated by an apparatus based on driving of the vibration apparatus. The sound collected through the microphone can be input to the control PC through the sound card, and a control program can check the input sound to analyze the sound output characteristic of the apparatus.

A sound output characteristic has been measured in an anechoic chamber, which is closed in all directions. When measuring, a frequency signal is applied as a sine sweep within a range of 150 Hz to 20 kHz, and ⅓ octave smoothing has been performed on a measurement result. A separation distance between an apparatus and the microphone is adjusted to be 30 cm. However, a measurement method of the sound output characteristic is not limited thereto.

In FIG. 19, a solid line represents a sound output characteristic of the vibration apparatus according to the first embodiment of the present disclosure. A thick solid line represents a sound output characteristic of the vibration part in the vibration apparatus according to the third embodiment of the present disclosure.

As seen in FIG. 19, the vibration apparatus according to the first embodiment of the present disclosure can have an average sound pressure level of about 78.26 dB in 150 Hz to 20 kHz, an average sound pressure level of about 74.26 dB in 150 Hz to 1 kHz, an average sound pressure level of about 77.35 dB in 300 Hz to 800 Hz, an average sound pressure level of about 77.61 dB in 1 kHz to 10 kHz, an average sound pressure level of about 77.28 dB in 2 kHz to 4 kHz, and an average sound pressure level of about 78.26 dB in 150 Hz to 8 kHz. Therefore, the vibration apparatus according to the first embodiment of the present disclosure can have a sound pressure level characteristic of 78 dB or more in 150 Hz to 20 kHz.

Further, the vibration apparatus according to the third embodiment of the present disclosure can have an average sound pressure level of about 81.75 dB in 150 Hz to 20 kHz, an average sound pressure level of about 82.92 dB in 150 Hz to 1 kHz, an average sound pressure level of about 84.87 dB in 300 Hz to 800 Hz, an average sound pressure level of about 80.80 dB in 1 kHz to 10 kHz, an average sound pressure level of about 78.74 dB in 2 kHz to 4 kHz, and an average sound pressure level of about 81.79 dB in 150 Hz to 8 kHz. Therefore, the vibration apparatus according to the third embodiment of the present disclosure can have a sound pressure level characteristic of 81 dB or more in 150 Hz to 20 kHz. In addition, comparing with the vibration apparatus according to the first embodiment of the present disclosure, the vibration apparatus according to the third embodiment of the present disclosure can have a high sound pressure level characteristic of 3 dB higher or more in 150 Hz to 20 kHz and can have a high sound pressure level characteristic of 5 dB higher or more in 150 Hz to 8 kHz.

Figure 20:
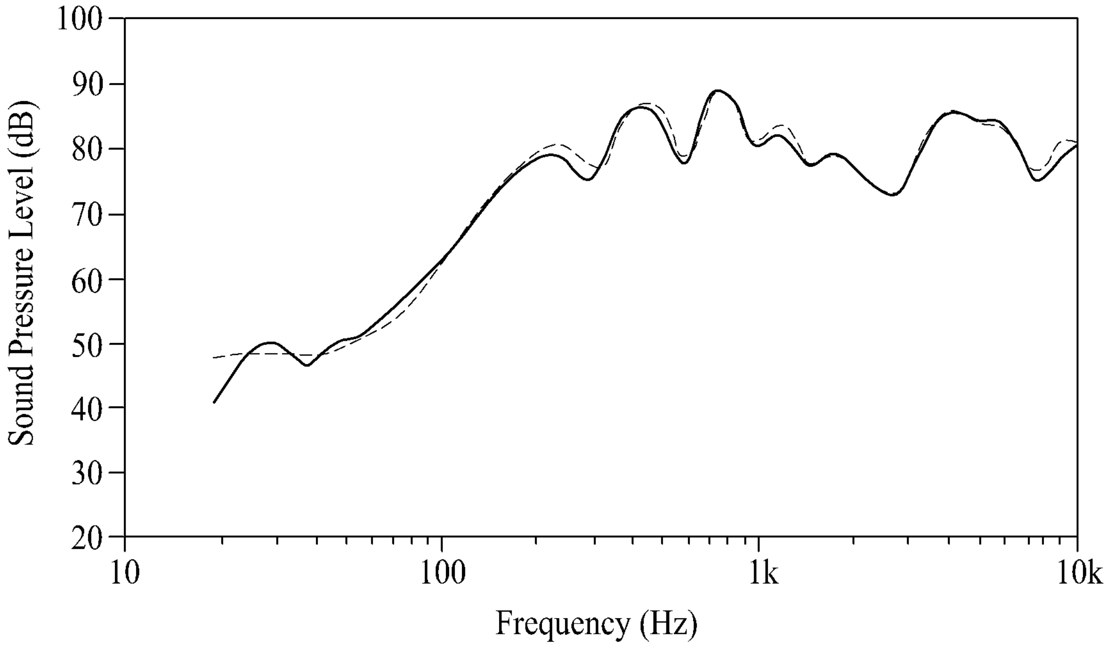
FIG. 20 illustrates an example of a sound output characteristic of a vibration apparatus according to the third embodiment of the present disclosure.

FIG. 20 illustrates an example of a sound output characteristic of a vibration apparatus according to the third embodiment of the present disclosure. FIG. 20 illustrates a sound output characteristic with respect to a driving time in a vibration apparatus. In FIG. 20, the abscissa axis represents a frequency in hertz (Hz), and the ordinate axis represents a sound pressure level (SPL) in decibels (dB).

In FIG. 20, a dotted line represents a sound output characteristic with respect to an initial driving time in the vibration apparatus according to the third embodiment of the present disclosure. A thick solid line represents a sound output characteristic with respect to a driving time of 500 hours in the vibration apparatus according to the third embodiment of the present disclosure.

As seen in FIG. 20, as in the dotted line, in the initial driving time, the vibration apparatus according to the third embodiment of the present disclosure can have an average sound pressure level of about 82.92 dB in 150 Hz to 20 kHz, an average sound pressure level of about 84.87 dB in 150 Hz to 1 kHz, an average sound pressure level of about 80.80 dB in 300 Hz to 800 Hz, an average sound pressure level of about 78.74 dB in 1 kHz to 10 kHz, an average sound pressure level of about 81.79 dB in 2 kHz to 4 kHz, and an average sound pressure level of about 81.92 dB in 150 Hz to 8 kHz. In addition, as in the thick solid line, in the driving time of 500 hours, the vibration apparatus according to the third embodiment of the present disclosure can have an average sound pressure level of about 81.30 dB in 150 Hz to 20 kHz, an average sound pressure level of about 83.68 dB in 150 Hz to 1 kHz, an average sound pressure level of about 79.56 dB in 300 Hz to 800 Hz, an average sound pressure level of about 77.52 dB in 1 kHz to 10 kHz, an average sound pressure level of about 80.45 dB in 2 kHz to 4 kHz, and an average sound pressure level of about 80.62 dB in 150 Hz to 8 kHz. Therefore, it can be seen that the vibration apparatus according to the third embodiment of the present disclosure has a sound pressure level variation of about 2 dB or less in the initial driving time and the driving time of 500 hours. Accordingly, the present disclosure can provide a vibration apparatus where a structure and a manufacturing process are simplified and driving reliability is enhanced.

A vibration apparatus and an apparatus including the same according to one or more embodiments of the present disclosure will be described below.

A vibration apparatus according to an embodiment of the present disclosure can comprise a vibration generating part including one or more vibration parts, a first cover member covering a first surface of the vibration generating part, a second cover member covering a second surface of the vibration generating part, the second surface being opposite to the first surface of the vibration generating part, and a signal supply member electrically connected to the one or more vibration parts and disposed between the first surface of the vibration generating part and the first cover member.

According to one or more embodiments of the present disclosure, the signal supply member can comprise a first signal line and a second signal line electrically connected to the one or more vibration parts, respectively, between the first surface of the vibration generating part and the first cover member.

According to one or more embodiments of the present disclosure, the one or more vibration parts can comprise a vibration layer including a piezoelectric material and having first and second surfaces being opposite to each other, a first electrode layer at the first surface of the vibration layer, and a second electrode layer at the second surface of the vibration layer. The signal supply member can be electrically connected to the first electrode layer and the second electrode layer, between the first electrode layer and the first cover member.

According to one or more embodiments of the present disclosure, the signal supply member can comprise a first signal line and a second signal line electrically connected to the first electrode layer and the second electrode layer, respectively, between the first electrode layer and the first cover member.

According to one or more embodiments of the present disclosure, the signal supply member can comprise a first signal line electrically connected to the first electrode layer, and a second signal line electrically insulated from the first electrode layer and electrically connected to the second electrode layer According to one or more embodiments of the present disclosure, the vibration apparatus can further comprise a connection member electrically connecting the second signal line with the second electrode layer.

According to one or more embodiments of the present disclosure, the connection member can include a conductive double-sided adhesive member.

According to one or more embodiments of the present disclosure, the connection member can comprise a first connection portion electrically connected to the second electrode layer, a second connection portion electrically insulated from the first electrode layer and electrically connected to the second signal line, and a third connection portion between the first connection portion and the second connection portion.

According to one or more embodiments of the present disclosure, the vibration apparatus can further comprise an insulation member electrically insulating the second signal line from the first electrode layer.

According to one or more embodiments of the present disclosure, the signal supply member can further comprise a base member, and the first signal line and the second signal line are formed by patterning of a conductive layer formed or deposited at a first surface of the base member.

According to one or more embodiments of the present disclosure, the one or more vibration parts of the vibration generating part can comprise a first vibration part and a second vibration part overlapping the first vibration part. The signal supply member can be electrically connected to each of the first vibration part and the second vibration part, between the first vibration part and the first cover member.

According to one or more embodiments of the present disclosure, the first vibration part and the second vibration part can be configured to vibrate in a same direction.

According to one or more embodiments of the present disclosure, each of the first vibration part and the second vibration part can comprise a vibration layer including a piezoelectric material, a first electrode layer at a first surface of the vibration layer, and a second electrode layer at a second surface of the vibration layer, the second surface of the vibration layer being opposite to the first surface of the vibration layer.

According to one or more embodiments of the present disclosure, the signal supply member can comprise a first signal line electrically connected to the first electrode layer of the first vibration part and the second electrode layer of the second vibration part, and a second signal line electrically connected to the second electrode layer of the first vibration part and the first electrode layer of the second vibration part.

According to one or more embodiments of the present disclosure, the vibration apparatus can further comprise a first connection member electrically connected to the first electrode layer of the first vibration part and electrically connected to the second electrode layer of the second vibration part, and a second connection member electrically insulated from the first electrode layer of the first vibration part and electrically connected to the second electrode layer of the first vibration part with the first electrode layer of the second vibration part. The signal supply member can be electrically connected to the first connection member and the second connection member.

According to one or more embodiments of the present disclosure, the signal supply member can comprise a first signal line and a second signal line electrically connected to the first connection member and the second connection member, respectively, between the first vibration part and the first cover member.

According to one or more embodiments of the present disclosure, the vibration apparatus can further comprise an insulation member electrically insulating the first electrode layer of the first vibration part from the second connection member.

According to one or more embodiments of the present disclosure, the first connection member can comprise a first connection portion electrically connected to the second electrode layer of the second vibration part, a second connection portion electrically connected to the first electrode layer of the first vibration part and electrically connected to the first signal line, and a third connection portion between the first connection portion and the second connection portion.

According to one or more embodiments of the present disclosure, the second connection member can comprise a first connection portion electrically connected to the second electrode layer of the first vibration part and the first electrode layer of the second vibration part, a second connection portion electrically insulated from the first electrode layer of the first vibration part and electrically connected to the second signal line, and a third connection portion between the first connection portion and the second connection portion.

According to one or more embodiments of the present disclosure, each of the first and second connection members can comprise a conductive double-sided adhesive member.

According to one or more embodiments of the present disclosure, the vibration apparatus can further comprise an intermediate member disposed between the second electrode layer of the first vibration part and the first electrode layer of the second vibration part, the intermediate member including an opening portion. The second connection member can be connected to the second electrode layer of the first vibration part and the first electrode layer of the second vibration part in common through the opening portion of the intermediate member.

According to one or more embodiments of the present disclosure, the vibration apparatus can further comprise a first adhesive layer between the first surface of the vibration generating part and the first cover member to cover a portion of the signal supply member, and a second adhesive layer between the second surface of the vibration generating part and the second cover member.

An apparatus according to one or more embodiments of the present disclosure can comprise a passive vibration member, and one or more vibration generating apparatuses configured to vibrate the passive vibration member. The one or more vibration generating apparatuses can comprise a vibration apparatus, and the vibration apparatus can comprise a vibration generating part including one or more vibration parts, a first cover member covering a first surface of the vibration generating part, a second cover member covering a second surface of the vibration generating part, the second surface being opposite to the first surface of the vibration generating part, and a signal supply member electrically connected to the one or more vibration parts and disposed between the first surface of the vibration generating part and the first cover member.

According to one or more embodiments of the present disclosure, the apparatus can further comprise a first adhesive layer between the first surface of the vibration generating part and the first cover member to cover a portion of the signal supply member, and a second adhesive layer between the second surface of the vibration generating part and the second cover member.

According to one or more embodiments of the present disclosure, the apparatus can further comprise an enclosure disposed at a rear surface of the passive vibration member to cover the one or more vibration generating apparatuses.

According to one or more embodiments of the present disclosure, the passive vibration member can comprise a vibration plate which includes one or more materials among metal, plastic, wood, paper, fiber, cloth, leather, glass, rubber, carbon, and mirror.

According to one or more embodiments of the present disclosure, the passive vibration member comprises one or more of a display panel including a pixel configured to display an image, a screen panel on which an image is to be projected from a display apparatus, a light emitting diode lighting panel, an organic light emitting lighting panel, an inorganic light emitting lighting panel, a signage panel, a vehicular interior material, a vehicular exterior material, a vehicular glass window, a vehicular seat interior material, a building ceiling material, a building interior material, a building glass window, an aircraft interior material, an aircraft glass window, and a mirror.

A vibration apparatus according to an embodiment of the present disclosure can be applied to or included in a vibration apparatus disposed at an apparatus. The apparatus according to an embodiment of the present disclosure can be applied to or included in mobile apparatuses, video phones, smart watches, watch phones, wearable apparatuses, foldable apparatuses, rollable apparatuses, bendable apparatuses, flexible apparatuses, curved apparatuses, sliding apparatuses, variable apparatuses, electronic organizers, electronic books, portable multimedia players (PMPs), personal digital assistants (PDAs), MP3 players, mobile medical devices, desktop personal computers (PCs), laptop PCs, netbook computers, workstations, navigation apparatuses, automotive navigation apparatuses, automotive display apparatuses, automotive apparatuses, theater apparatuses, theater display apparatuses, TVs, wall paper display apparatuses, signage apparatuses, game machines, notebook computers, monitors, cameras, camcorders, and home appliances, or the like. In addition, the vibration apparatus or the vibration generating apparatus according to one or more embodiments of the present disclosure can be applied to or included in organic light-emitting lighting apparatuses or inorganic light-emitting lighting apparatuses. When the vibration apparatus or the vibration generating apparatus of one or more embodiments of the present disclosure is applied to or included in lighting apparatuses, the lighting apparatuses can act as lighting and a speaker. In addition, when the vibration apparatus or the vibration generating apparatus according to one or more embodiments of the present disclosure is applied to or included in a mobile device, or the like, the vibration apparatus or the vibration generating apparatus can be one or more of a speaker, a receiver, and a haptic device, but embodiments of the present disclosure are not limited thereto.

It will be apparent to those skilled in the art that various modifications and variations can be made in the present disclosure without departing from the scope of the disclosures. Thus, it is intended that the present disclosure covers the modifications and variations of this disclosure provided they come within the scope of the appended claims and their equivalents.

What is claimed is:

1. A vibration apparatus, comprising:

a vibration generating part including one or more vibration parts, the one or more vibration parts including a vibration layer including a first surface and a second surface opposing the first surface, a first electrode layer covering at least a portion of the first surface of the vibration layer, and a second electrode layer covering at least a portion of the second surface of the vibration layer;

a first cover member covering a first surface of the vibration generating part;

a second cover member covering a second surface of the vibration generating part, the second surface being opposite to the first surface of the vibration generating part;

an adhesive layer in direct contact between the first electrode layer and the first cover member;

a signal supply member configured to supply driving signals to the vibration generating part, the signal supply member including a first signal line electrically connected to the first electrode layer and a second signal line electrically connected to the second electrode layer with the first signal line and the second signal line both disposed between the first electrode layer of the vibration generating part and the first cover member;

an insulation member disposed between a rear surface of the second signal line and an upper surface of the first electrode layer to have an island shape or a line shape; and a connection member disposed between the insulation member and the first cover member and extending to be electrically connected to the second electrode layer, wherein at least one of the first signal line and the second signal line is spaced apart from the vibration layer, wherein each of the first signal line and the second signal line disposed between the first electrode layer and the first cover member is in direct contact with the adhesive layer, wherein the connection member comprises a conductive double-sided adhesive member, and wherein the second signal line is electrically connected to the connection member at a location between the insulation member and the first cover member and electrically connected to the second electrode layer via the connection member.

2. The vibration apparatus of claim 1, wherein the second signal line is spaced apart from the second electrode layer, and wherein both the first signal line and the second signal line are spaced apart from the vibration layer.

3. The vibration apparatus of claim 2, wherein the first signal line is electrically connected to the first electrode layer between the upper surface of the first electrode layer and the first cover member, and wherein the connection member extends from a first location between the first electrode layer and the first cover member to a second location between the second electrode layer and the second cover member and is electrically connected to the second electrode layer.

4. The vibration apparatus of claim 3, wherein the insulation member comprises a base insulation film disposed between the rear surface of the second signal line and the upper surface of the first electrode layer, and an adhesive member attached between the base insulation film and the upper surface of the first electrode layer, and the first signal line and the second signal line are disposed on an insulative base member and are partially covered by another insulation member.

5. The vibration apparatus of claim 1, wherein the connection member comprises:

a first connection portion electrically connected to the second electrode layer;

a second connection portion disposed between the rear surface of the second signal line and the insulation member and electrically connected to the second signal line; and a third connection portion disposed between the first connection portion and the second connection portion.

6. The vibration apparatus of claim 5, wherein the third connection portion is bent from the first connection portion toward one lateral surface of the vibration generating part, and wherein the second connection portion is bent from the third connection portion toward a portion between the second signal line and the insulation member.

7. The vibration apparatus of claim 1, wherein the one or more vibration parts of the vibration generating part comprise a first vibration part and a second vibration part overlapping the first vibration part, the vibration layer of the first vibration part being discontinuous from the vibration layer of the second vibration part, and wherein the signal supply member is electrically connected to each of the first vibration part and the second vibration part, between the first vibration part and the first cover member.

8. The vibration apparatus of claim 7, wherein the first vibration part and the second vibration part are configured to vibrate in a same direction.

9. The vibration apparatus of claim 7, wherein each of the first vibration part and the second vibration part comprises the vibration layer, the first electrode layer, and the second electrode layer, and wherein the vibration layer includes a piezoelectric material.

10. The vibration apparatus of claim 9, wherein the first signal line is electrically connected to the first electrode layer of the first vibration part and the second electrode layer of the second vibration part, and wherein the second signal line is electrically connected to the second electrode layer of the first vibration part and the first electrode layer of the second vibration part.

11. The vibration apparatus of claim 9, wherein the connection member comprises:

a first connection member electrically connected to the first electrode layer of the first vibration part and electrically connected to the second electrode layer of the second vibration part; and a second connection member electrically insulated from the first electrode layer of the first vibration part by the insulation member and electrically connected to the second electrode layer of the first vibration part with the first electrode layer of the second vibration part.

12. The vibration apparatus of claim 11, wherein the first signal line is electrically connected to the first connection member at a first location between the first connection member and the first cover member, and wherein the second signal line is electrically connected to the second connection member at a second location between the second connection member and the first cover member.

13. The vibration apparatus of claim 12, wherein the second connection member comprises:

the insulation member electrically insulating the second signal line from the first electrode layer, and the adhesive member disposed between the insulation member and the first electrode layer.

14. The vibration apparatus of claim 12, wherein the first connection member comprises:

a first connection portion electrically connected to the second electrode layer of the second vibration part;

a second connection portion electrically connected to the first electrode layer of the first vibration part and electrically connected to the first signal line; and a third connection portion between the first connection portion and the second connection portion.

15. The vibration apparatus of claim 12, wherein the second connection member comprises:

a first connection portion electrically connected to the second electrode layer of the first vibration part and the first electrode layer of the second vibration part;

a second connection portion disposed between the second signal line and the insulation member and electrically connected to the first-second signal line; and a third connection portion between the first connection portion and the second connection portion.

16. The vibration apparatus of claim 11, wherein each of the first and second connection members comprises a conductive double-sided adhesive member.

17. The vibration apparatus of claim 11, further comprising an intermediate member disposed between the second electrode layer of the first vibration part and the first electrode layer of the second vibration part, the intermediate member including an opening portion, wherein the second connection member is connected to the second electrode layer of the first vibration part and the first electrode layer of the second vibration part in common through the opening portion of the intermediate member.

18. The vibration apparatus of claim 1, wherein the adhesive layer comprises:

a first adhesive layer disposed between the first electrode layer and the first cover member to cover a portion of the signal supply member and each of the first signal line and the second signal line; and a second adhesive layer between the second surface of the vibration generating part and the second cover member, and wherein the vibration generating part is surrounded by the first adhesive layer and the second adhesive layer.

19. An apparatus, comprising:

a passive vibration member; and one or more vibration generating apparatuses configured to vibrate the passive vibration member, wherein the one or more vibration generating apparatuses comprises the vibration apparatus of claim 1.

20. The apparatus of claim 19, wherein the adhesive layer comprises:

a first adhesive layer disposed between the first electrode layer and the first cover member to cover a portion of the signal supply member and each of the first signal line and the second signal line; and a second adhesive layer between the second surface of the vibration generating part and the second cover member, and wherein the vibration generating part is surrounded by the first adhesive layer and the second adhesive layer.

21. The apparatus of claim 19, further comprising an enclosure disposed at a rear surface of the passive vibration member to cover the one or more vibration generating apparatuses.

22. The apparatus of claim 19, wherein the passive vibration member comprises a vibration plate which includes one or more materials among metal, plastic, wood, paper, fiber, cloth, leather, glass, rubber, carbon, and mirror.

23. The apparatus of claim 19, wherein the passive vibration member comprises one or more of: a display panel including a pixel configured to display an image, a screen panel on which an image is to be projected from a display apparatus, a light emitting diode lighting panel, an organic light emitting lighting panel, an inorganic light emitting lighting panel, a signage panel, a vehicular interior material, a vehicular exterior material, a vehicular glass window, a vehicular seat interior material, a building ceiling material, a building interior material, a building glass window, an aircraft interior material, an aircraft glass window, and a mirror.

* * * * *